(12) United States Patent
Ebrahimi Afrouzi et al.

(10) Patent No.: US 12,630,068 B1
(45) Date of Patent: May 19, 2026

(54) ROBOTIC TOWING DEVICE

(71) Applicants: Ali Ebrahimi Afrouzi, San Diego, CA (US); Lukas Fath, York (CA); Shahin Fathi Djalali, San Leandro, CA (US)

(72) Inventors: Ali Ebrahimi Afrouzi, San Diego, CA (US); Lukas Fath, York (CA); Shahin Fathi Djalali, San Leandro, CA (US)

(73) Assignee: Bobsweep USA, Las Vegas, NV (US)

( * ) Notice: Subject to any disclaimer, the term of this patent is extended or adjusted under 35 U.S.C. 154(b) by 486 days.

(21) Appl. No.: 17/475,990

(22) Filed: Sep. 15, 2021

Related U.S. Application Data

(63) Continuation of application No. 16/244,833, filed on Jan. 10, 2019, now Pat. No. 11,155,247.

(60) Provisional application No. 62/748,921, filed on Oct. 22, 2018, provisional application No. 62/748,513, filed on Oct. 21, 2018, provisional application No. 62/731,740, filed on Sep. 14, 2018, provisional application No. 62/703,754, filed on Jul. 26, 2018, provisional application No. 62/661,926, filed on Apr. 24, 2018, provisional application No. 62/643,523, filed on Mar. 15, 2018, provisional application No. 62/626,867, filed on Feb. 6, 2018, provisional application No. 62/617,734, filed on Jan. 16, 2018, provisional application No. 62/616,326, filed on Jan.
(Continued)

(51) Int. Cl.
| | |
|---|---|
| *B60P 3/07* | (2006.01) |
| *G05D 1/00* | (2024.01) |
| *G05D 1/43* | (2024.01) |
| *G05D 1/622* | (2024.01) |

(52) U.S. Cl.
CPC .............. *B60P 3/07* (2013.01); *G05D 1/0011* (2013.01); *G05D 1/00* (2013.01); *G05D 1/43* (2024.01); *G05D 1/622* (2024.01)

(58) Field of Classification Search
CPC ........... B60P 3/07; G05D 1/0011; G05D 1/00; G05D 1/43; G05D 1/622
See application file for complete search history.

(56) References Cited

U.S. PATENT DOCUMENTS

| | | |
|---|---|---|
| 4,307,891 A | 12/1981 | Doornick et al. |
| 5,170,352 A | 12/1992 | McTamaney et al. |
| | (Continued) | |

FOREIGN PATENT DOCUMENTS

| | | |
|---|---|---|
| CN | 108490956 A | 5/2018 |
| DE | 102004001198 A1 | 1/2004 |
| | (Continued) | |

*Primary Examiner* — Jason Holloway
*Assistant Examiner* — Blake A Wood

(57) ABSTRACT

Provided is a versatile robotic chassis including: a chassis; a set of wheels coupled to the chassis; a processor; a plurality of sensors; a battery; and a tangible, non-transitory, machine-readable medium storing instructions that when executed by the processor effectuates operations, including: capturing, with the plurality of sensors, sensor data; recognizing, with the processor, a street sign, a pot hole, and a speed bump based on at least some of the sensor data; and responding, with the versatile robotic chassis, to the street sign; wherein: the versatile robotic chassis is customizable; the versatile robotic chassis is configured to be coupled with different types of components that enable different robotic functions; and the versatile robotic chassis is configured to run different types of software that enable different robotic functions.

20 Claims, 34 Drawing Sheets

100

102

101

Related U.S. Application Data 11, 2018, provisional application No. 62/615,697, filed on Jan. 10, 2018.

(56)                    References Cited

U.S. PATENT DOCUMENTS

| | | | |
|---|---|---|---|
| 5,229,941 | A | 7/1993 | Hattori |
| 6,151,539 | A | 11/2000 | Bergholz et al. |
| 6,431,078 | B2 | 8/2002 | Serrano |
| 6,523,629 | B1 * | 2/2003 | Buttz ........................ B60D 1/58 |
| | | | 901/1 |
| 8,352,112 | B2 | 1/2013 | Mudalige |
| 8,430,192 | B2 | 4/2013 | Gillett |
| 9,513,627 | B1 * | 12/2016 | Elazary ............ G05B 19/41865 |
| 9,552,564 | B1 | 1/2017 | Martenis |
| 10,303,171 | B1 * | 5/2019 | Brady .................. G05D 1/0088 |
| 2011/0170994 | A1 | 7/2011 | Coombs |
| 2015/0149022 | A1 | 5/2015 | Harvey |
| 2015/0217819 | A1 * | 8/2015 | Pojidaev .............. B62D 63/025 |
| | | | 180/9.42 |
| 2015/0279210 | A1 | 10/2015 | Zafiroglu et al. |
| 2015/0346727 | A1 | 12/2015 | Ramanujam |
| 2016/0042239 | A1 * | 2/2016 | Fowe ................. G08G 1/09623 |
| | | | 382/104 |
| 2016/0115702 | A1 | 4/2016 | Nordbruch |
| 2016/0236869 | A1 * | 8/2016 | Kimura ................. G05D 1/0291 |
| 2017/0287233 | A1 * | 10/2017 | Nix ......................... G08G 1/166 |
| 2018/0060776 | A1 * | 3/2018 | Ahmed ................ G07C 5/0808 |
| 2018/0104815 | A1 | 4/2018 | Yang |
| 2018/0281178 | A1 | 10/2018 | Jacobsen |
| 2018/0345971 | A1 * | 12/2018 | Birnschein ........... B62D 21/152 |
| 2019/0023147 | A1 | 1/2019 | Kurai |
| 2019/0061456 | A1 | 2/2019 | Kurai |
| 2019/0176676 | A1 * | 6/2019 | Delp ...................... G06Q 50/40 |
| 2020/0055357 | A1 | 2/2020 | Laine |
| 2020/0156868 | A1 | 5/2020 | Bidram |
| 2020/0283229 | A1 * | 9/2020 | Edwards .............. G05D 1/0297 |
| 2021/0081888 | A1 * | 3/2021 | Taylor ................ G06Q 10/0833 |

FOREIGN PATENT DOCUMENTS

| | | | |
|---|---|---|---|
| FR | 2526181 | A1 | 4/1982 |
| RU | 2586758 | C2 | 8/2014 |
| RU | 179843 | U1 | 2/2017 |
| WO | 2015114592 | A1 | 1/2014 |

* cited by examiner

FIG. 19A
FIG. 19B
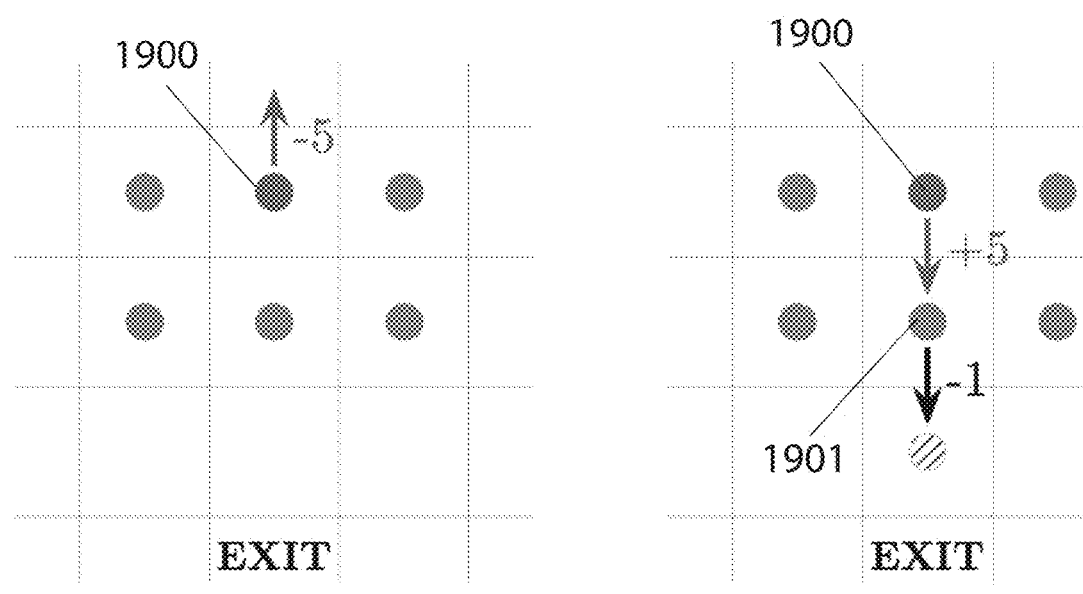
FIG. 19C
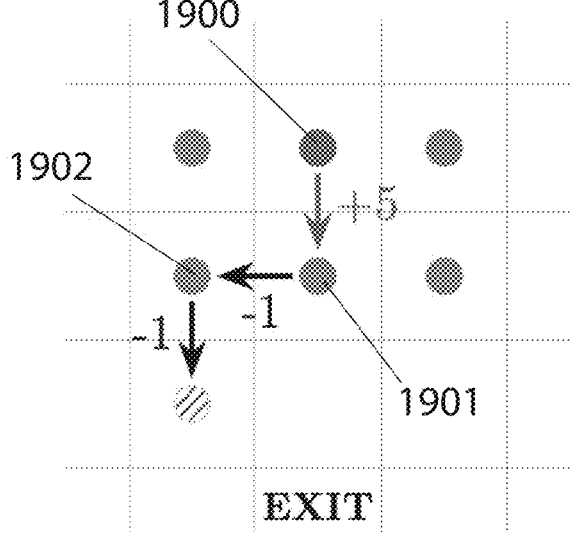

ROBOTIC TOWING DEVICE

CROSS-REFERENCE TO RELATED APPLICATIONS

This application is a Continuation of U.S. Non-Provisional patent application Ser. No. 16/244,833, filed Jan. 10, 2019, which claims the benefit of U.S. Provisional Patent Application Nos. 62/615,697, filed Jan. 10, 2018, 62/731,740, filed Sep. 14, 2018, 62/748,921, filed Oct. 22, 2018, 62/617,734, filed Jan. 16, 2018, 62/748,513, filed Oct. 21, 2018, 62/643,523, filed Mar. 15, 2018, 62/661,926, filed Apr. 24, 2018, 62/703,754, filed Jul. 26, 2018, 62/616,326, filed Jan. 11, 2018, and 62/626,867, filed Feb. 6, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/048,179, 16/048,185, 16/163,541, 16/163,562, 16/163,508, 16/185,000, 62/681,965, 62/614,449, 16/109,617, 16/051,328, 15/449,660, 16/041,286, 15/406,890, 14/673,633, 16/163,530, 62/746,688, 62/740,573, 62/740,580, 15/955,480, 15/425,130, 15/955,344, 15/048,827, 15/981,643, 15/986,670, 62/664,389, 15/447,450, 15/447,623, 62/665,942, 62/617,589, 62/620,352, 15/951,096, 16/130,880, 14/948,620, 16/127,038, and 16/230,805 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to autonomous vehicle systems and more particularly to mechanisms, structures, and operation of autonomous vehicle systems.

BACKGROUND

Autonomous mobile robotic devices are increasingly used to automate tasks within environments. However, autonomous robotic devices are often built to serve only a particular type of function and to execute their function individually. A versatile autonomous robotic device that can be customized based on its intended function can be advantageous. Further, an autonomous mobile robotic device that can collaboratively execute functions with other autonomous mobile robotic devices can be advantageous, particularly as the number of autonomous robotic devices used within society increases.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a versatile robotic chassis including: a chassis; a set of wheels coupled to the chassis; a processor; a plurality of sensors; a battery; and a tangible, non-transitory, machine-readable medium storing instructions that when executed by the processor effectuates operations, including: capturing, with the plurality of sensors, sensor data; recognizing, with the processor, a street sign, a pot hole, and a speed bump based on at least some of the sensor data; and responding, with the versatile robotic chassis, to the street sign; wherein: the versatile robotic chassis is customizable; the versatile robotic chassis is configured to be coupled with different types of components that enable different robotic functions; and the versatile robotic chassis is configured to run different types of software that enable different robotic functions.

BRIEF DESCRIPTION OF DRAWINGS

FIGS. 8A-8G illustrate an example of a sequence of steps for loading a pod onto a mobile robotic chassis according to some embodiments.

FIGS. 9A-9F illustrate an example of a sequence of steps for loading a pod onto a mobile robotic chassis according to some embodiments.

FIGS. 19A-19C illustrate examples of different action sequences of robotic chassis according to some embodiments.

DETAILED DESCRIPTION OF SOME EMBODIMENTS

Figure 1:
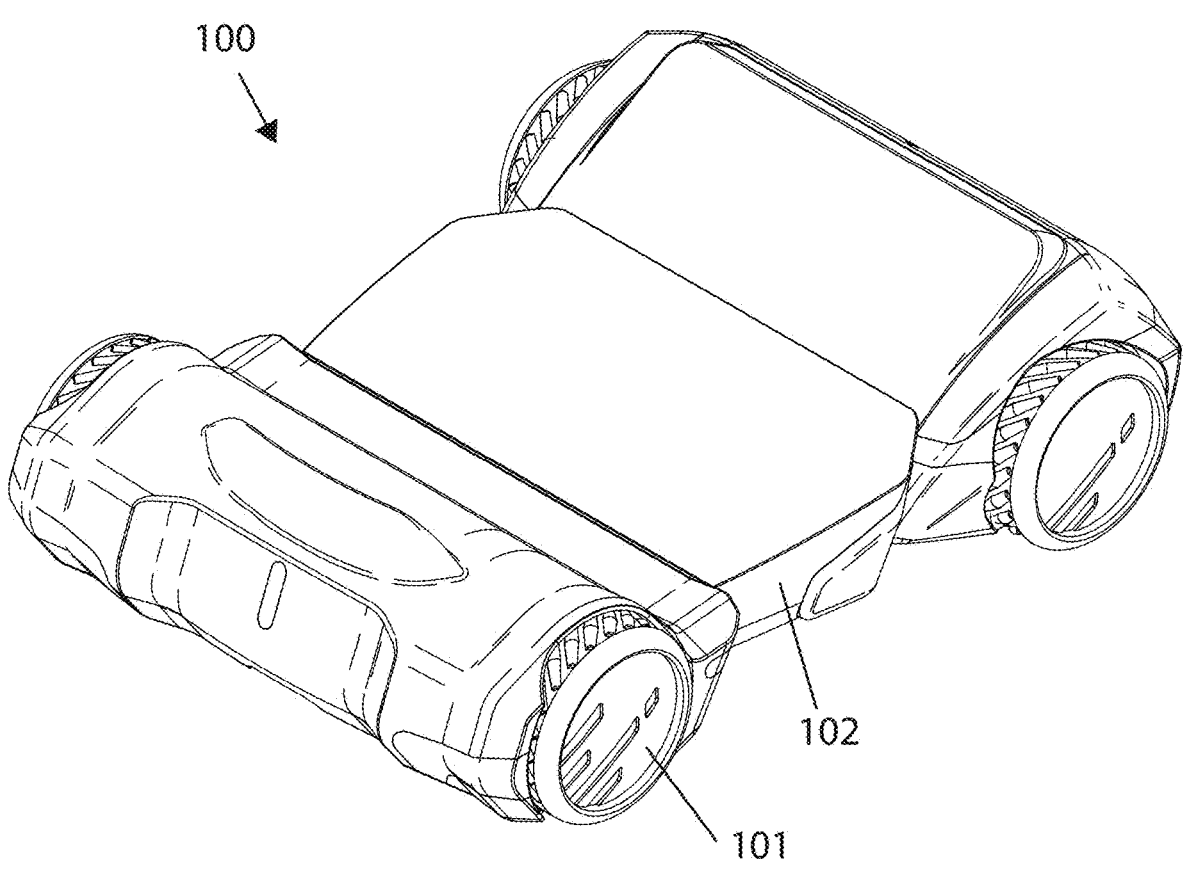
FIG. 1 illustrates an example of a versatile mobile robotic chassis customized with a platform for carrying items according to some embodiments.

The present techniques will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present techniques may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering tradeoffs may warrant systems that only afford a subset of the benefits described herein or that will be apparent to one of ordinary skill in the art.

Some embodiments provide one or more autonomous versatile mobile robotic chassis that can be customized to provide a variety of different functions. For example, a mobile robotic chassis can be customized to include a platform for transporting items, a loading and unloading mechanism for transporting passenger pods, a shovel for plowing, a wheel lift for towing vehicles, robotic arms for garbage pickup, and a forklift for lifting vehicles. In some embodiments, a mobile robotic chassis includes, but is not limited to, wheels, motors, a power source, internal and external sensors, one or more processors, one or more controllers, a mapping module, a localization module, and a path planning module. In some embodiments, the wheels are mecanum wheels and allow movement in any direction. Examples of mecanum wheels are described in U.S. Patent Application Nos. 62/664,389, Ser. Nos. 15/447,450, and 15/447,623, the entire contents of which are hereby incorporated by reference. In some embodiments, the one or more processors include the mapping, localization, and path planning modules. In some embodiments, sensors include, but are not limited to, sonar sensors, light detection and ranging (LIDAR) sensors, laser detection and ranging (LADAR) sensors, cameras, stereo and structured light sensors, odometry sensors, inertial measurement units (IMU), global positioning systems (GPS), structure from motion sensors and gyroscopes. In some embodiments, the mobile robotic chassis further includes a suspension system such as those described in U.S. Patent Application Nos. 62/665,942, 62/617,589, 62/620,352, and Ser. No. 15/951,096, the entire contents of which are hereby incorporated by reference. In some embodiments, the mobile robotic chassis further includes one or more electrical ports (e.g., electrical socket, mobile device charging port, home assistant charging port, etc.) that are supplied electricity using a separate or the same rechargeable battery as the main rechargeable battery of the mobile robotic chassis or solar energy. An example a versatile mobile robotic chassis is further described in U.S. patent application Ser. No. 16/230,805, the entire contents of which is hereby incorporated by reference.

In some embodiments, the mapping module or the one or more processors create a map of the environment using methods similar to those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, the localization module or the one or more processors localize the mobile robotic chassis using methods similar to those described in U.S. Patent Application Nos. 62/746,688, 62/740,573, 62/740,580, Ser. Nos. 15/955,480, 15/425,130, and 15/955,344 the entire contents of which are hereby incorporated by reference. In some embodiments, the path planning module or the one or more processors determine a route of the mobile robotic chassis using methods similar to those described in U.S. patent application Ser. Nos. 16/041,286, 15/406,890, and 14/673,633, the entire contents of which are hereby incorporated by reference.

In some embodiments, the mobile robotic chassis further includes an operating system and an operating system interface. In some embodiments, the operating system interface is displayed on a touch screen of the robotic chassis. In some embodiments, different types of hardware can be installed and detected by the operating system such that the versatile mobile robotic chassis can be customized based on the function of the chassis. In some embodiments, wherein the installed hardware is not detected by the operating system, the operating system interface displays a message to a user requesting the driver file of the hardware. In some embodiments, the versatile mobile robotic chassis includes expansion slots for different types of hardware, such as imaging sensors, movement sensors, RAM, hard drives, controllers, etc., such that different types of hardware can be added and removed as needed. For example, a mobile robotic chassis customized with a platform and carrying case for delivering food is equipped with high-resolution sensors and additional RAM since the processor must recognize and respond to street signs (e.g., speed limits, stop signs and stop lights) and environmental conditions (e.g., speed bumps or potholes) while travelling at a relatively quick speed. In another example, a mobile robotic chassis customized with a platform transports a trash can from a back of a house to a front of the house for pickup. In this instance, the mobile robotic chassis is only equipped with low-resolution sensors as high-speed travel is not required and navigation is limited to moving from the back to the front of the house. In a further example, a mobile robotic chassis customized with a loading and unloading mechanism capable of loading a pod transports persons in a pod from a home environment to an office. Since the functionality involves transportation of humans, the robotic chassis is equipped with high resolution sensors to provide the highest safety standards. In some embodiments, hardware is installed on an as need basis depending on, for example, the transported item, the payload, and the function of the versatile mobile robotic chassis. In some embodiments, the hardware and operating system of the versatile mobile robotic chassis are calibrated or recalibrated for their intended function. For example, if a mobile robotic chassis was not initially calibrated for transportation of shipping containers from a shipyard to a train yard, new hardware (e.g., cameras, sensors, memory, processors, hard drives, etc.) and mechanical structures (e.g., tow bar, extended platform, etc.) required in transporting shipping containers are added. In some embodiments, additional software is used to meet functionality requirements of the versatile mobile robotic chassis.

In some embodiments, a mobile robotic chassis recharges its batteries at a charging station. In some embodiments, a mobile robotic chassis is partially or fully powered using solar energy and/or fuel. In some embodiments, a mobile robotic chassis recharges or refuels when the power remaining is below a predetermined threshold. In some embodiments, the mobile robotic chasses recharges or refuels at the nearest located recharging or refueling station.

In some embodiments, a processor of a mobile robotic chassis performs a self-test (e.g., using installed software). In some embodiments, the processor instructs the mobile robotic chassis to navigate to a repair station if damage is detected. In some embodiments, a processor of a mobile robotic chassis instructs the robotic chassis to navigate to a repair station after a predetermined amount of time, a predetermined amount of run time, a predetermined mileage, or based on another metric. In some embodiments, a robotic chassis autonomously navigates to a charging station when battery charge reaches below a predetermined level.

In some embodiments, the versatile robotic chassis is customized based on, for example, the transported item, payload or the intended functionality of the mobile robotic chassis. For example, a mobile robotic chassis can be customized to further include a platform of particular size for transporting items, a loading and unloading mechanism that allows for transportation of passenger pods, a shovel for plowing, a wheel lift for towing vehicles, robotic arms for garbage pickup, and a forklift for lifting vehicles. In some embodiments, the mobile robotic chassis is customized to include clasps, magnets, straps, cords or other securing mechanisms to secure items to the robotic chassis.

FIG. 1 illustrates an example of versatile mobile robotic chassis 100, which may be of various shapes or sizes, with wheels 101 customized with platform 102 for transporting items such as, food, bicycles, groceries, delivery packages, building supplies, warehouse stock boxes, luggage, and the like. In some embodiments, the mobile robotic chassis is customized to include clasps, magnets, straps, cords, bolts and screws, pins, or other securing mechanisms to secure items to the robotic chassis.

Figure 2A:
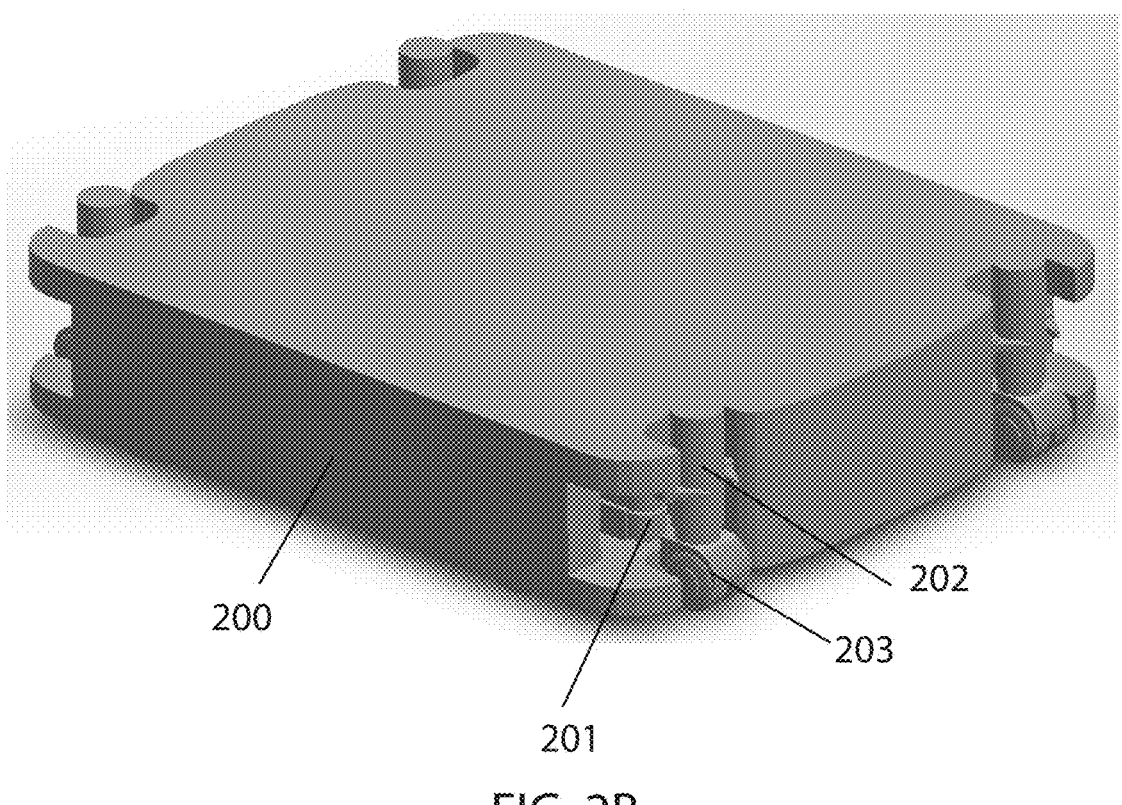
FIGS. 2A-2G illustrate an example of a versatile mobile robotic chassis customized with retractable arms and lifts for towing vehicles according to some embodiments.
Figure 2B:
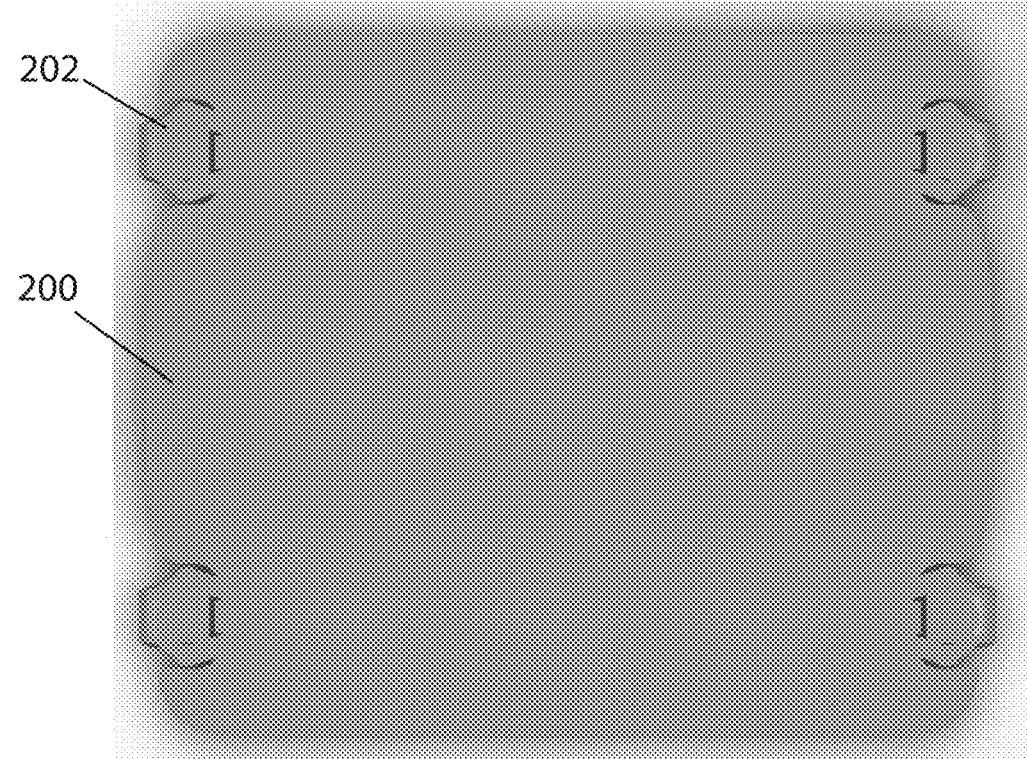
Figure 2C:
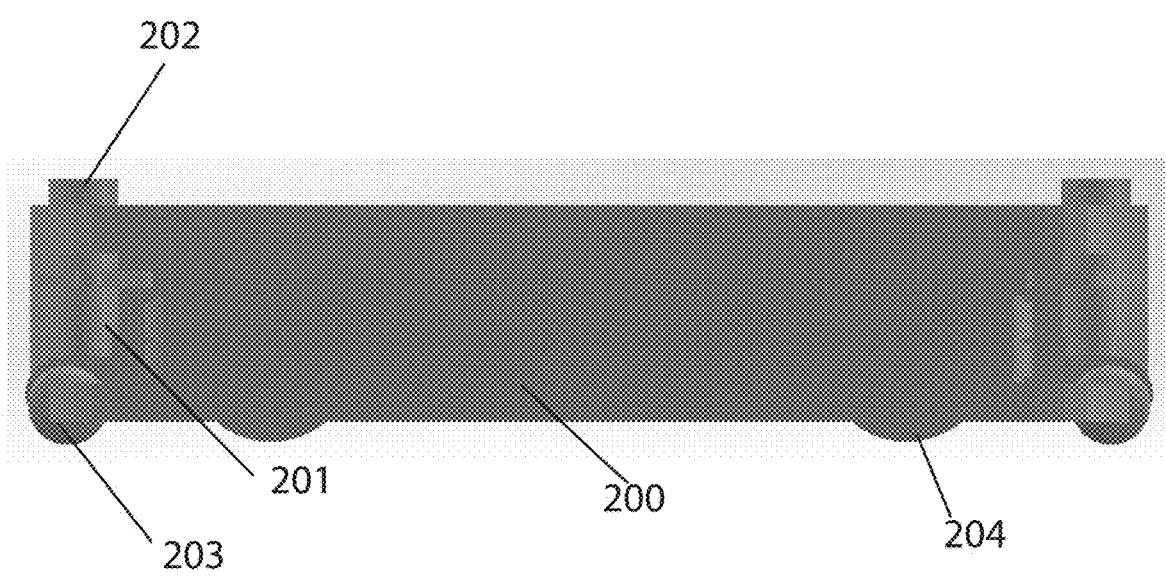
Figure 2D:
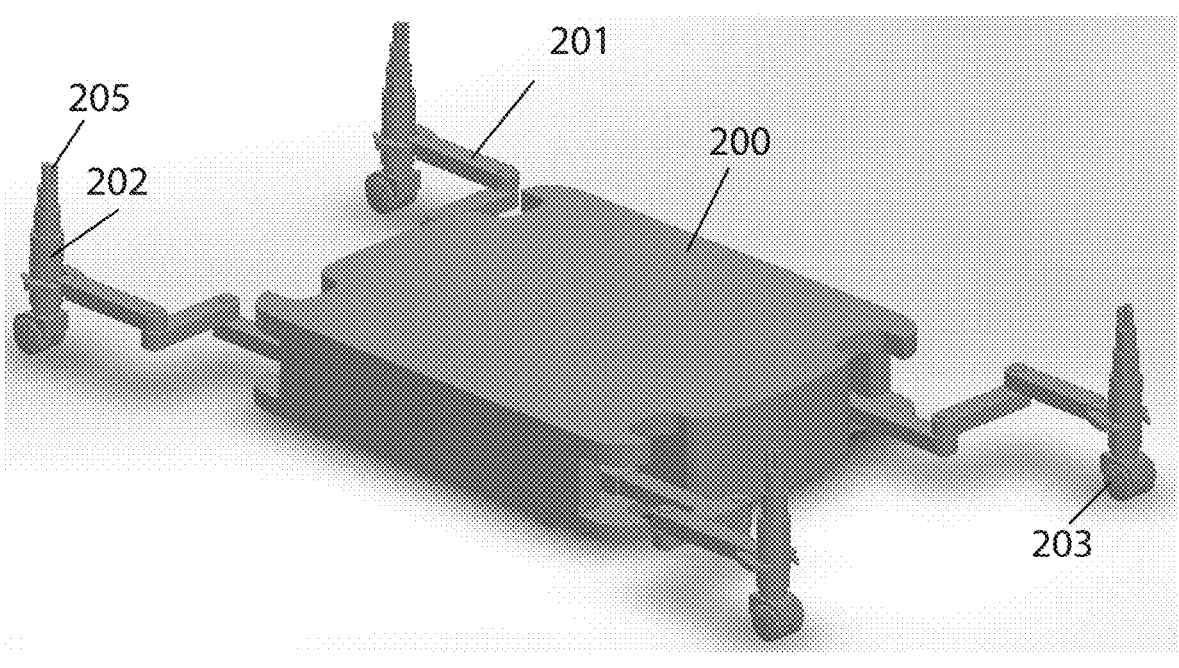
Figure 2E:
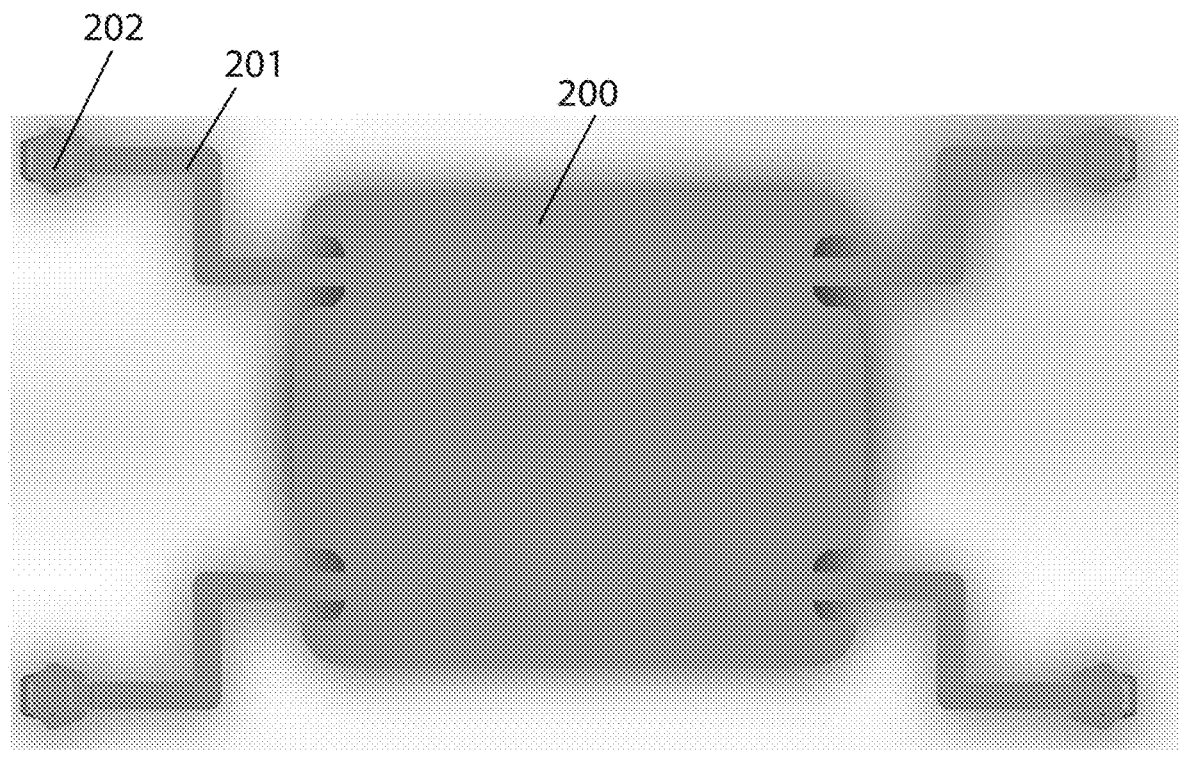
Figure 2F:
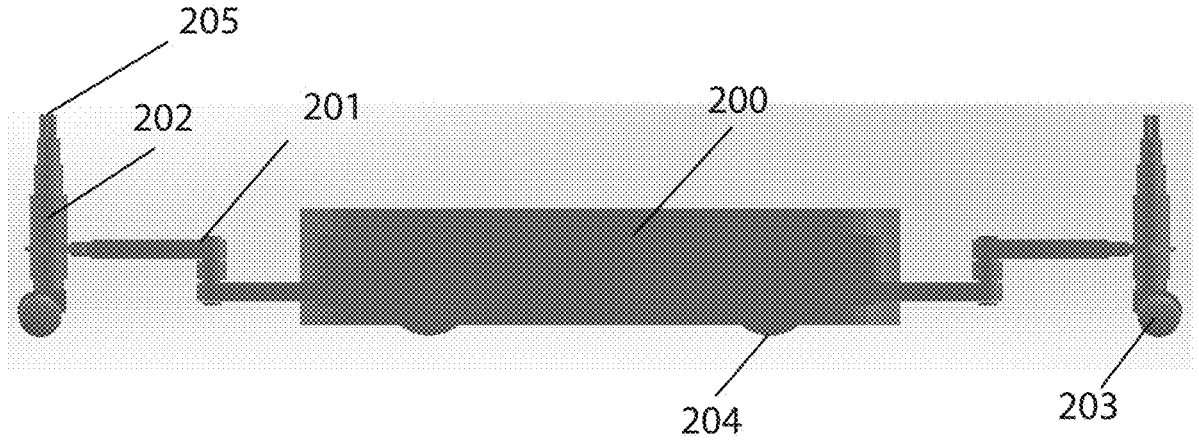
Figure 2G:
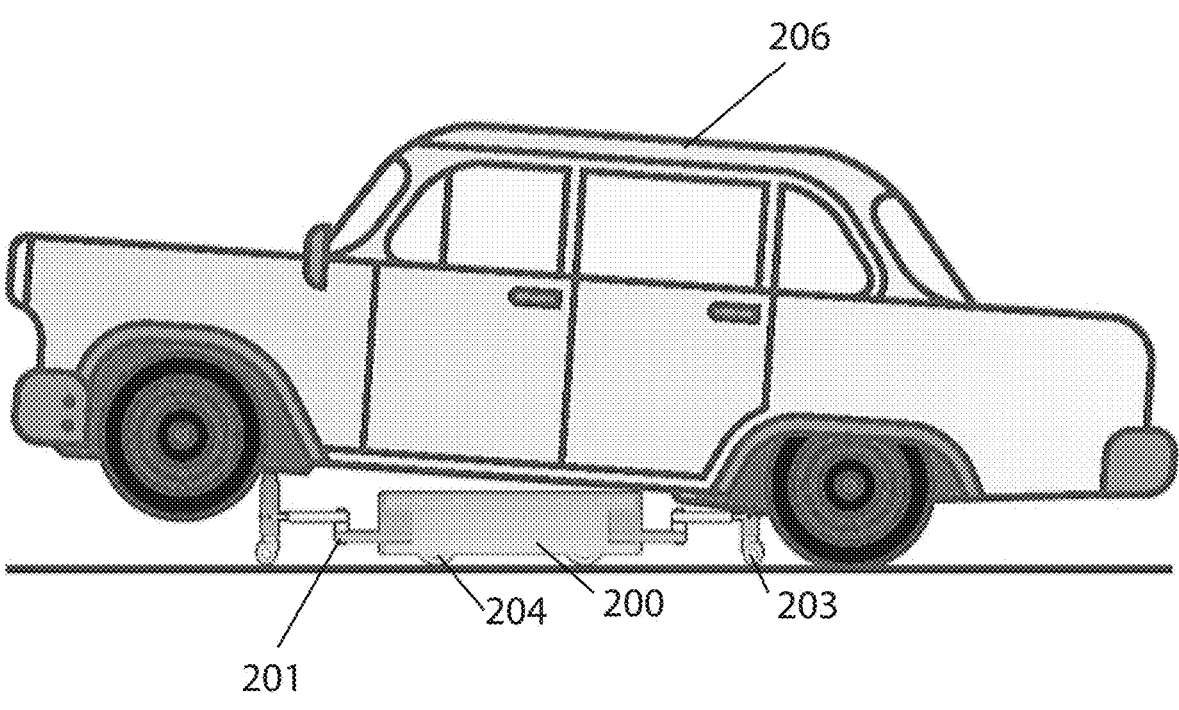

FIGS. 2A-2C illustrate different views of an example of a customized versatile mobile robotic chassis. The versatile mobile robotic chassis is customized to create a robotic towing device that can tow vehicles (or other objects with or without wheels). In FIG. 2A, the robotic towing device includes the mobile robotic chassis (hidden beneath casing), casing 200, retractable arms 201 coupled to the chassis, and lifts 202 with lift wheels 203 coupled to terminal ends of retractable robotic arms 201. In FIG. 2B, a top view of the robotic towing device with casing 200 and lifts 202 illustrated. In FIG. 2C, a side view of the robotic towing device with casing 200, retractable arms 201, lifts 202 with lift wheels 203, and robotic device wheels 204 is illustrated. In FIGS. 2A-2C, retractable arms 201 are retracted within casing 200 as towing mode is inactive. FIGS. 2D-2F illustrate the robotic towing device when towing mode is active. In FIG. 2D, retractable arms 201 are extended from within casing 200 and include links pivotally coupled. Cylinders 205 of lifts 202 coupled to retractable arms 201 extend upwards from within lifts 202. Lift wheels 203 roll along the driving surface as retractable arms 201 retract and extend. In FIG. 2E, a top view of the robotic towing device with extended retractable arms 201 and coupled lifts 202 is illustrated. In FIG. 2F, a side view of the robotic towing device with extended retractable arms 201 and coupled lifts 202 with extended cylinders 205 is illustrated. FIG. 2G illustrates the robotic towing device with extended retractable arms 201 and cylinders 205 for lifting vehicle 206. Cylinders 205 positioned at the front of the robotic towing device (not shown) extend further upwards than cylinders 205 positioned at the back of the robotic towing device (not shown) to tow vehicle 206. In other embodiments, other variations of the robotic towing device are possible.

For example, in other embodiments, a robotic towing device includes a mobile robotic chassis, a casing coupled to the mobile robotic chassis, one or more retractable arms coupled to the mobile robotic chassis, and one or more lifts with a lift wheel, each of the one or more lifts corresponding and coupled to a terminal end of one of the one or more retractable arms. In some embodiments, the robotic towing device includes four retractable arms, two at the front of the chassis and two at the back of the chassis. In some embodiments, the one or more retractable arms include one or more links pivotally coupled to one another. In some embodiments, each lift is operated hydraulically and in other embodiments, each lift is operated by a motor or by other means. In some embodiments, the one or more retractable arms are retracted within the casing of the robotic towing device and a cylinder of each of the one or more lifts are retracted within the lift when towing mode is inactive. In some embodiments, the one or more retractable arms and the cylinder of each of the one or more lifts are extended when towing mode is active. In some embodiments, a processor of the robotic towing device activates towing mode when it is in an optimal position for lifting the vehicle to be towed. In some embodiments, the processor determines when the robotic device is in optimal position using computer vision technology and sensors. In some embodiments, the lift wheel of each of the one or more lifts rolls along a driving surface as the one or more retractable arms retract or extend. In some embodiments, the cylinder of each of the one or more lifts extend upwards to lift the vehicle for towing. In some embodiments, the cylinders of the lifts coupled to the retractable arms at the front of the chassis extend further upwards than the lifts coupled to the retractable arms at the back of the chassis. In some embodiments, the amount of extension of the retractable arms and the cylinders of the lifts is variable and depends on the vehicle being towed. In some embodiments, the amount of extension of the one or more retractable arms is different. In some embodiments, the amount of extension of the cylinders of each of the one or more lifts is different. In some embodiments, the processor determines the amount of extension for the retractable arms and lifts using computer vision technology and sensors. In some embodiments, the robotic towing device tows the vehicle to a final location within an environment after the cylinders of the lifts are extended upwards, each lift wheel and each wheel of the robotic chassis rolling along the driving surface as the robotic towing device tows the vehicle to the final location within the environment. In some embodiments, the processor deactivates towing mode when the vehicle is positioned at the final location. When towing mode is deactivated, the cylinder of each of the one or more lifts and the one or more retractable arms retract. In some embodiments, the retractable arms are permanently extended.

In other embodiments, other configurations of a robotic towing device are possible. For example, in other embodiments, the robotic towing device includes a standard wheel lift trailer, a flat bed, or a ramp.

Figure 3:
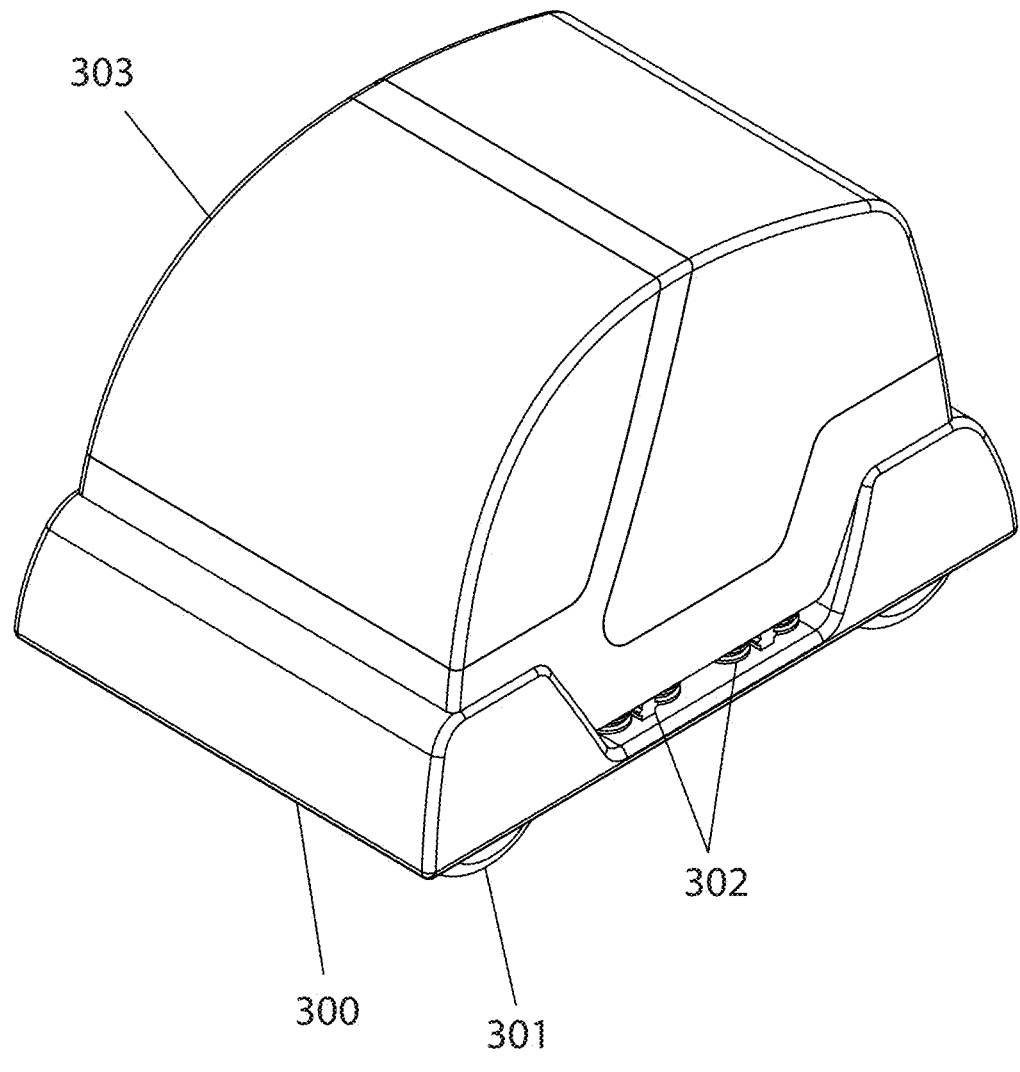
FIG. 3 illustrates an example of a versatile mobile robotic platform customized with a pod loading and unloading mechanism and a pod loaded in the mobile robotic chassis according to some embodiments.

FIG. 3 illustrates an example of versatile mobile robotic chassis 300 with wheels 301 customized with loading and unloading mechanism 302 for pod 303, which may be of various shapes or sizes and within which products, items, animals, and/or persons may be transported.

In some embodiments, the mechanism for loading and unloading a pod to and from a mobile robotic chassis includes: a mobile robotic chassis with a front, rear and middle part wherein the middle part includes one or more pins on a front, back and top side, and wherein the front and rear part include a pair of wheels and one or more rails into which the one or more pins from the front and back side of the middle part fit; a pod including one or more rails on a bottom side; a transfer part including one or more pins on a front, back and top side, the one or more pins of the top side fitting into the one or more rails of the pod; a pod station with one or more rails into which the one or more pins on the front and back side of the transfer part fit. In some embodiments, the transfer part and the middle part of the mobile robotic chassis are exactly the same part and hence the distance between the rails on the front and rear parts of the mobile robotic chassis and the distance between the rails of the pod station are equal. In some embodiments, the front and rear parts of the mobile robotic chassis are configured such that two middle parts are slidingly coupled to the front and rear parts. In some embodiments, the pod is configured such that two middle parts are slidingly coupled to the bottom of the pod.

In some embodiments, a pod is slidingly coupled with a transfer part wherein one or more pins on a top side of the transfer part fit into one or more rails on a bottom side of the pod. In some embodiments, the transfer part is locked into place, such as in the center of the pod, such that it may not slide along the rails on the bottom side of the pod. In some embodiments, a locking mechanism includes locking pins driven by a motor connected to a gear box wherein locking pins are extended on either side of top pins of the transfer part. For example, the locking pins mechanism is implemented into the rails of the pod such that the locking pins extend through holes in the rails of the pod on either side of top pins of the transfer part to lock the transfer part in place relative to the pod. In some embodiments, the transfer part with coupled pod is slidingly coupled to a pod station wherein one or more pins on a front and back side of the transfer part fit into one or more rails of the pod station. In some embodiments, the transfer part is locked into place, such as in the center of the pod station, such that it may not slide along the rails of the pod station. In some embodiments, a locking mechanism includes locking pins driven by a motor connected to a gear box wherein locking pins are extended on either side of front and back pins of the transfer part. For example, the locking pins mechanism is implemented into the rails of the pod station such that locking pins extend through holes in the rails on either side of the front and back pins of the transfer part to lock the transfer part in place relative to the pod station. In some embodiments, the pod is located at a pod station when the pod is not required. In some embodiments, wherein the pod is required, the pod is loaded onto a mobile robotic chassis. In some embodiments, the mobile chassis includes a front and rear part with driving wheels and one or more rails, and a middle part with one or more pins on a front, back, and top side. The middle part is slidingly coupled with the front and rear parts wherein one or more pins of the front and back side fit into one or more rails of the front and rear part. In some embodiments, the mobile robotic chassis aligns itself adjacent to a pod station such that the pod can be loaded onto the mobile chassis when, for example, the pod is required for transportation of items and/or passengers. In some embodiments, the mobile robotic chassis is aligned with the pod station when the middle part of the mobile robotic chassis and the transfer part, and hence the rails of the mobile robotic chassis and pod station, are aligned with one another. In some embodiments, prior to loading the pod the middle part of the mobile robotic chassis is positioned towards the side of the mobile robotic chassis furthest away from the pod station. In some embodiments, the middle part is locked in place using similar mechanisms as described above. In some embodiments, the transfer part with locked-in pod slides along the rails of the pod station towards the mobile robotic chassis, and with the rails of the mobile robotic chassis aligned with those of the pod station, the pins of the transfer part with attached pod fit directly into the rails of front and rear parts of the mobile robotic chassis. In some embodiments, the pins on the front and back side of the transfer part retract when transferring from the pod station to the mobile robotic chassis and extend into the rails of the front and rear of the mobile robotic chassis once transferred to the mobile robotic chassis. In some embodiments, the pins on the top side of the middle part retract when transferring the pod from the pod station to the mobile robotic chassis and extend into the rails of the bottom of the pod once transferred to the mobile robotic chassis. In some embodiments, the middle part of the mobile robotic chassis and the transfer part are locked into place using similar mechanisms as described above. After the transfer is complete, the pod slides to either side such that it is aligned with the robotic chassis and is locked in place. In some embodiments, different locking mechanisms, such as those described above, are used to unlock/lock components that are slidingly coupled to one another such that components can freely slide relative to one another when unlocked and remain in place when locked.

In some embodiments, the pod is unloaded from the mobile robotic chassis when no longer required for use. In some embodiments, the mobile robotic chassis aligns itself adjacent to a pod station such that the pod can be loaded onto the pod station. In some embodiments, the pod slides towards the transfer part such that is it centrally aligned with the transfer part and is locked in place. The transfer part with pod slides along the rails of the mobile robotic chassis towards the pod station, and with the rails of the mobile robotic chassis aligned with those of the pod station, the pins of the transfer part with attached pod fit directly into the rails of the pod station. In some embodiments, the pins on the front and back side of the transfer part retract when transferring from the mobile robotic chassis to the pod station and extend into the rails of the front and rear of the pod station once transferred to the pod station. In some embodiments, the pins on the top side of the middle part retract when transferring the pod from the mobile robotic chassis to the pod station. In some embodiments, the transfer part is locked in place once the transfer is complete. In some embodiments, sets of rollers operated by one or more motors are used to force components to slide in either direction.

In some embodiments, pods and pod stations are located at homes of users or in public areas. In some embodiments, after unloading a pod at a pod station the mobile robotic chassis navigates to the closest or a designated mobile robotic chassis parking area or storage area.

Figure 4A:
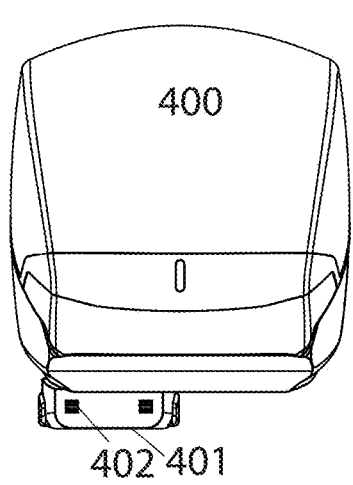
FIGS. 4A-4C illustrate an example of a pod and transfer part of a pod loading and unloading mechanism according to some embodiments.
Figure 4B:
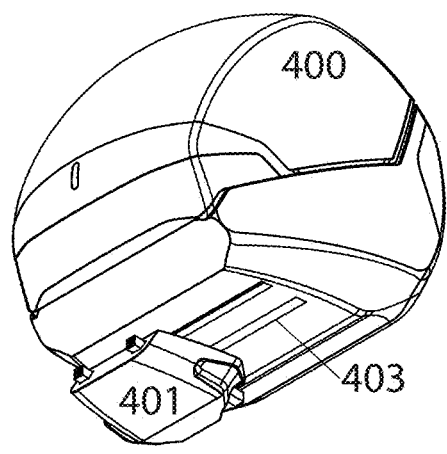

FIG. 4A illustrates an example of a front view of a pod 400 with transfer part 401. Transfer part 401 includes front pins 402, back pins (not shown) and top pins (not shown). FIG. 4B illustrates a perspective view of pod 400 with rails 403 on the bottom side of pod 400. Top pins of transfer part

Figure 4C:
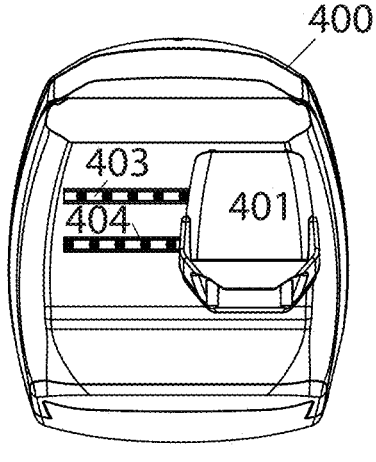

401 fit within rails 403 such that transfer part 401 slides back and forth along rails 403. FIG. 4C illustrates a bottom view of pod 400 with rails 403 and rollers 404. Top pins of transfer part 401 fit into rails 403 such that transfer part 401 slides along rails 403. In some cases, rollers 404 are operated by a motor and when operated cause transfer part 401 to slide along rails 403. In some embodiments, the rollers in the rails of the pod have gear teeth and the top side of the top pins of the transfer part have gear grooves, such that the gear teeth of the rollers fit into the gear grooves of the top side of the top pins and when operated cause linear movement of the transfer part.

Figure 5A:
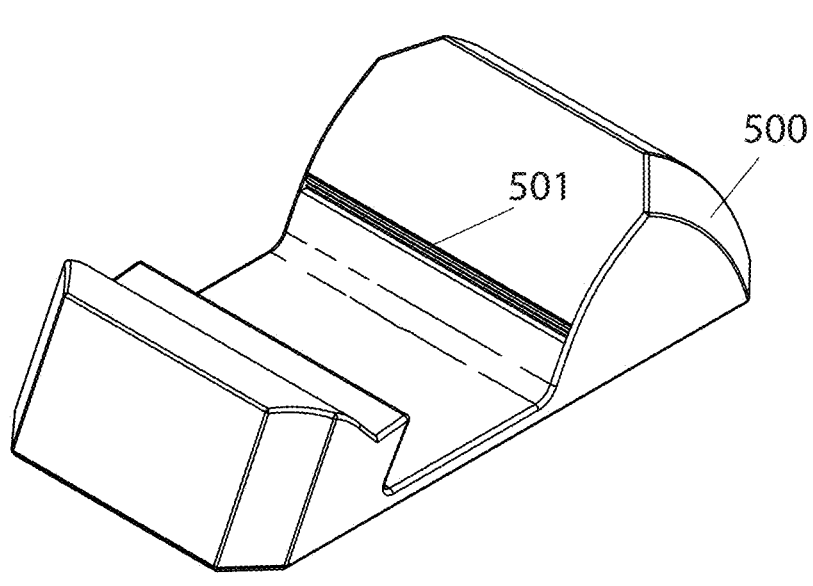
FIGS. 5A and 5B illustrate an example of a pod station with a docked pod and transfer part of a pod loading and unloading mechanism according to some embodiments.
Figure 5B:
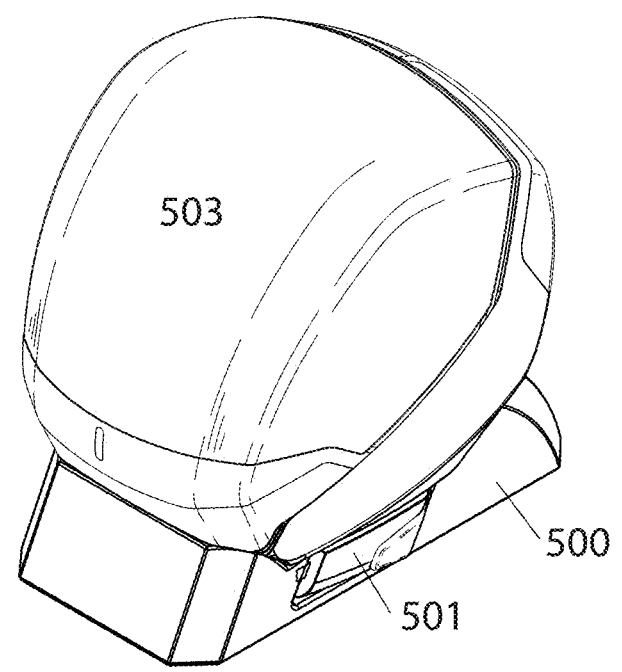

FIG. 5A illustrates an example of a pod station 500 with back rails 501 and front rails (not shown) within which back and front pins of a transfer part fit within such that the transfer part slides back and forth along front and back rails 501. FIG. 5B illustrates pod station 500 with transfer part 502 with pod 503 coupled to transfer part 502.

Figure 6:
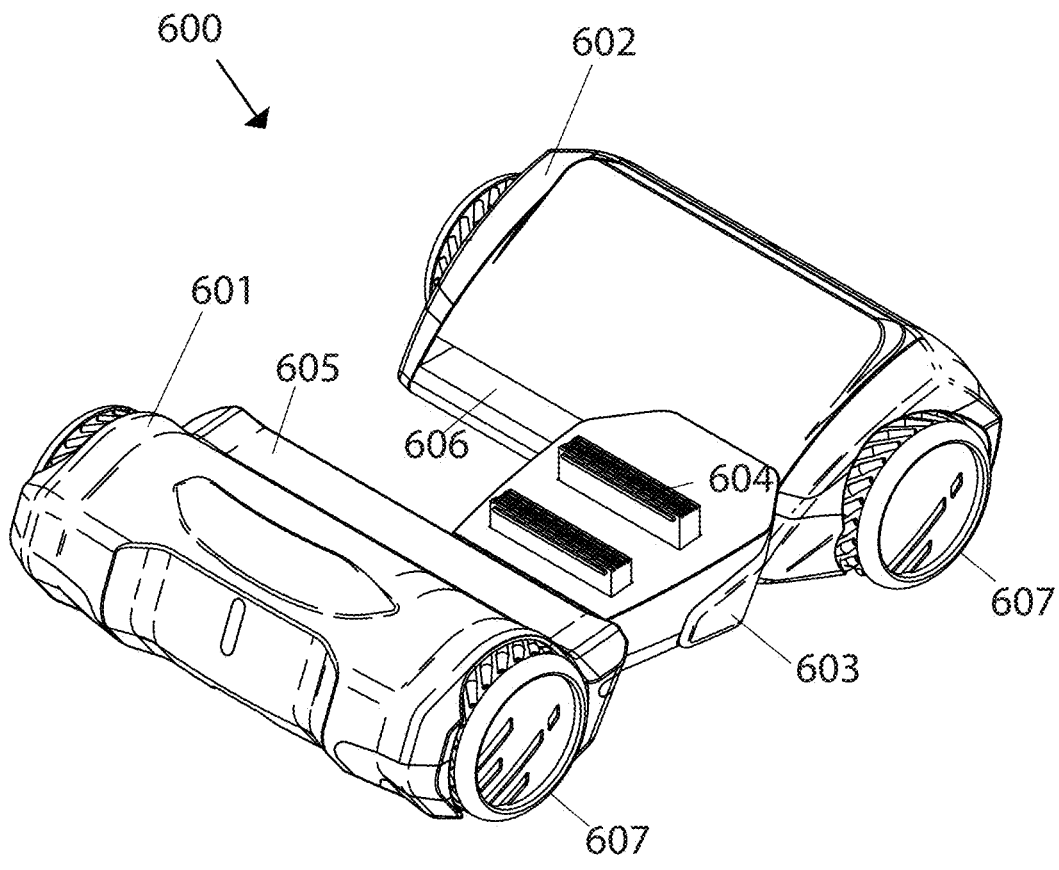
FIG. 6 illustrates an example of a mobile robotic chassis customized to transport pods according to some embodiments.

FIG. 6 illustrates an example of a mobile robotic chassis 600 with front part 601, rear part 602 and middle part 603. Middle part 603 includes top pins 604, front pins (not shown) and back pins (not shown). Front and back pins of middle part 603 fit into front rails 605 and back rails 606 of front part 601 and rear part 602, respectively, such that middle part 603 slides along rails 605 and 606. Front part 601 and rear part 602 further include wheels 607.

Figure 7A:
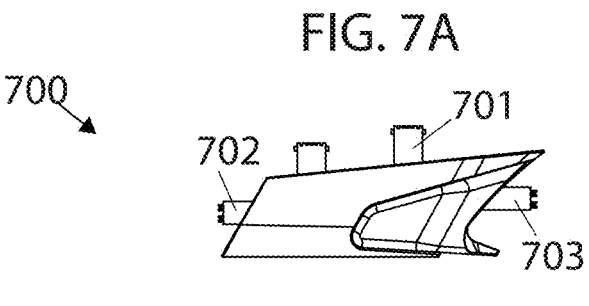
FIGS. 7A-7D illustrate an example of a middle or transfer part of a pod loading and unloading mechanism with extended and retracted pins according to some embodiments.
Figure 7B:
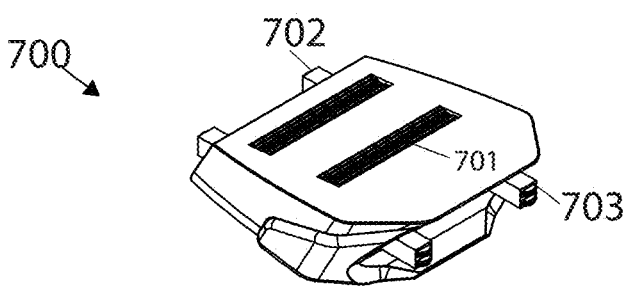
Figure 7C:
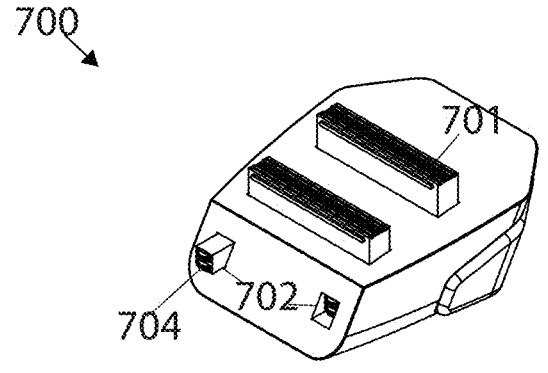
Figure 7D:
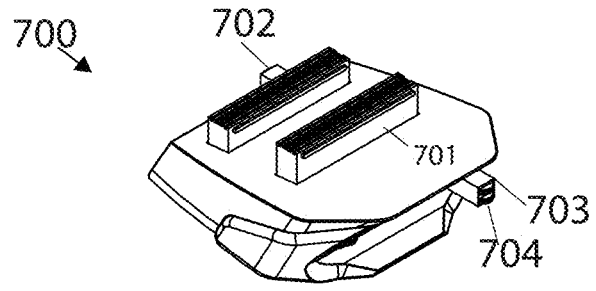

FIG. 7A illustrates an example of a middle or transfer part 700 (assuming they are the same design) with extended top pins 701, front pins 702 and back pins 703. Top pins 701, front pins 702 and back pins 703 are retracted in some instances. For example, front pins 702 and back pins 703 are retracted when transferring transfer part 700 with coupled pod from a pod station to a mobile chassis or top pins 701 of middle part 700 are retracted when transferring a pod on top of middle part 700. FIG. 7B illustrates an example of a middle or transfer part 700 (assuming they are the same design) with retracted top pins 701. FIG. 7C illustrates an example of a middle or transfer part 700 (assuming they are the same design) with one retracted and one extended front pin 702. FIG. 7D illustrates an example of a middle or transfer part 700 (assuming they are the same design) with one retracted and one extended back pin 703. Once transfer is complete, the pins are extended once again such that they fit into a set of rails. Front pins 702 and back pins 703 include rollers 704 operated by a motor. When rollers 704 are operated they cause transfer part 700 to slide along the rails of a pod station or mobile robotic chassis. In some embodiments, the rollers of the transfer part have gear teeth and the rails of the pod station and mobile robotic chassis have gear grooves, such that the gear teeth of the rollers fit into the gear grooves of the rail and when operated cause linear movement of the transfer part.

Other methods for loading and unloading the pod to and from the mobile robotic chassis can be used. For example, in some embodiments, the mobile robotic chassis aligns itself adjacent to a pod station such that the pod can be loaded onto the mobile robotic chassis. In some embodiments, the mobile robotic chassis is aligned with the pod station when the middle part of the mobile robotic chassis and the transfer part, and hence the rails of the mobile robotic chassis and pod station, are aligned with one another. In some embodiments, prior to loading the pod the middle part of the mobile robotic chassis is positioned towards the side of the mobile robotic chassis closest to the pod station. In some embodiments, the pod, initially centrally aligned with the transfer part, slides towards the mobile robotic chassis such that the transfer part and the middle part of the mobile robotic chassis are both positioned beneath the pod. In some embodiments, the pins on the top side of the middle part retract when transferring the pod onto the middle part and extend into the rails of the bottom of the pod once positioned on top of the transfer part and middle part. In some embodiments, the pod is locked in place. In some embodiments, the middle part of the mobile robotic chassis and the transfer part slide towards the mobile robotic chassis such that both are coupled to the front and rear parts of the mobile robotic chassis and the pod is centrally aligned with the mobile robotic chassis. In some embodiments, the pins on the front and back side of the transfer part retract when transferring from the pod station to the mobile robotic chassis and extend into the rails of the front and rear of the mobile robotic chassis once transferred to the mobile robotic chassis. In some embodiments, the middle part of the mobile robotic chassis and the transfer part are locked in place. In some embodiments, different locking mechanisms, such as those described above, are used to unlock/lock components that are slidingly coupled to one another such that components freely slide relative to one another when unlocked and remain in place when locked (e.g., transfer part relative to pod station or mobile robotic chassis, middle part relative to mobile robotic chassis, transfer part relative to pod). In some embodiments, the pod is unloaded from the mobile robotic chassis when no longer required for use. In some embodiments, the mobile robotic chassis aligns itself adjacent to a pod station such that the pod can be loaded onto the pod station. In some embodiments, the transfer part and middle part of the robotic chassis, to which the pod is locked, slide in a direction towards the pod station until the transfer part is coupled and centrally aligned with the pod station. In some embodiments, the transfer part is locked in place. In some embodiments, the pod slides towards the pod station until centrally aligned with the pod station and is locked in place. After unloading the pod at the pod station the mobile robotic chassis navigates to the closest or a designated parking area. In some embodiments, sets of rollers operated by one or more motors are used to force components to slide in either direction. In some embodiments, a pod is unloaded from a robotic chassis using an emergency button or switch within the pod.

Figure 8B:
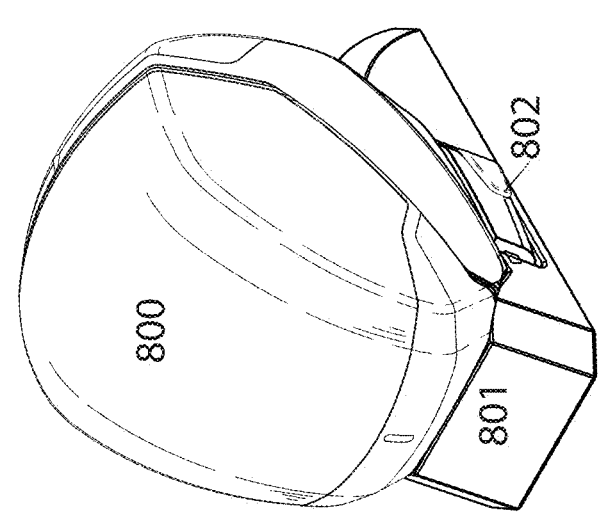
Figure 8A:
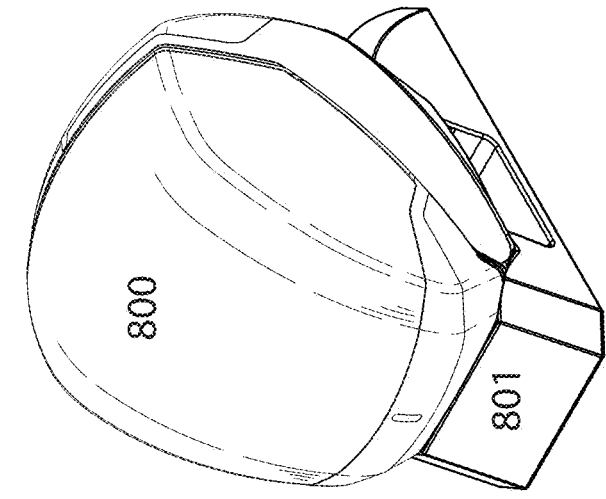
Figures 8C, 8D:
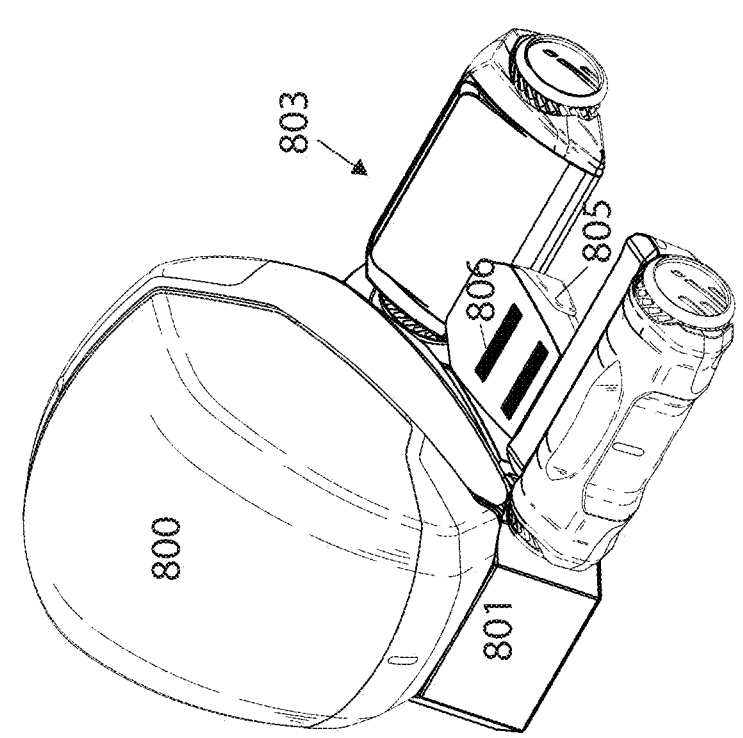
Figures 8E, 8F:
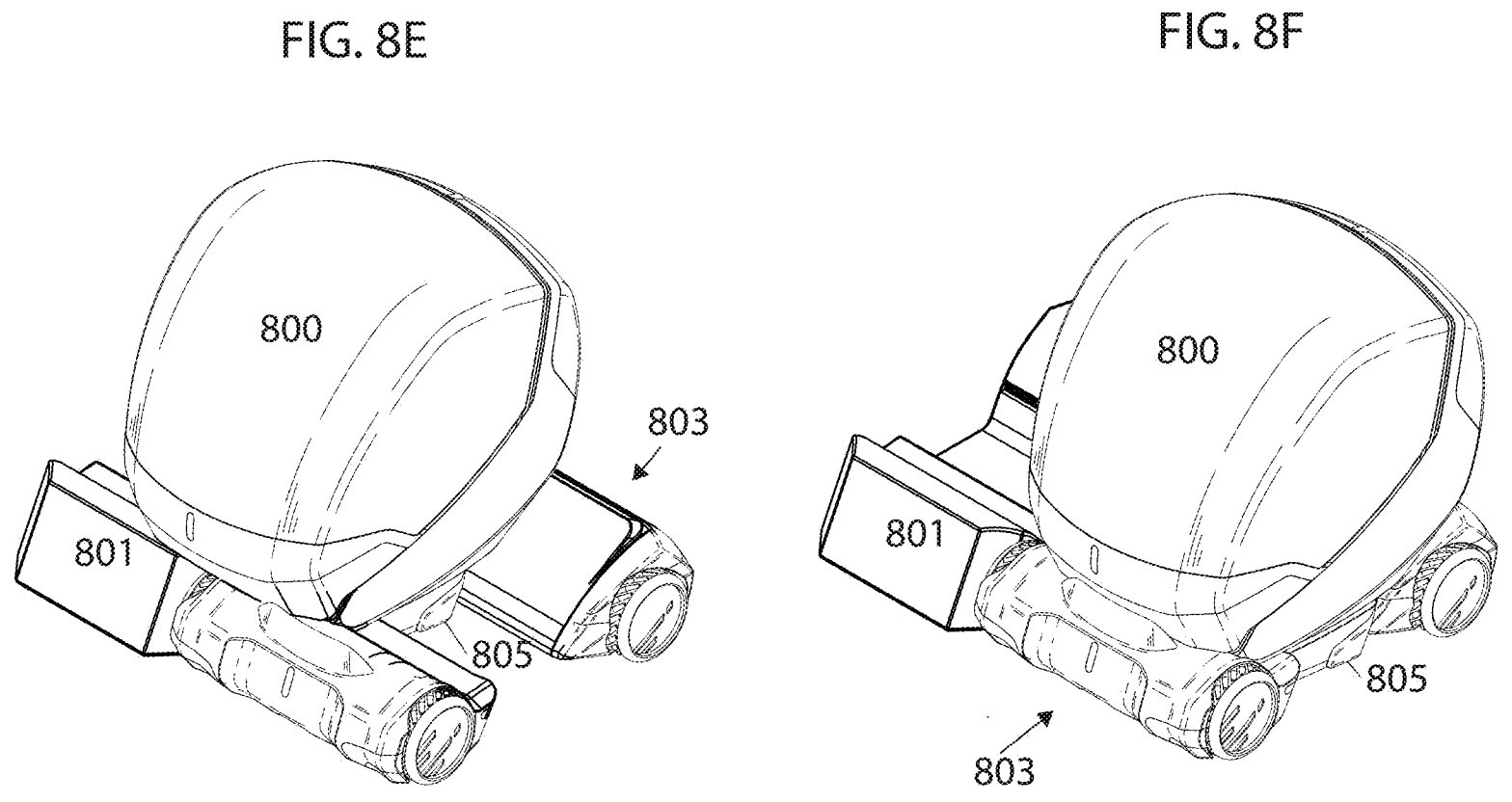

FIGS. 8A-8F illustrate an example of a sequence of steps for loading a pod onto a mobile robotic chassis. In FIG. 8A pod 800 is initially docked at pod station 801. A transfer part (not shown) is coupled to pod 800, the pins of which fit within rails on the bottom of pod 800 (not shown) such that the transfer part can slide back and forth along the rails of pod 801. In this position, the transfer part is positioned at the center of pod 800 and is locked in place. In FIG. 8B, transfer part 802 is unlocked and is moved as far as possible to one side of pod station 800 using, for example, rollers powered by a motor. Transfer part 802 is locked in place. In FIG. 8C, mobile robotic chassis 803 aligns with pod station 801 on the side closest to transfer part 802 to prepare for loading pod 800 onto mobile robotic chassis 803. The rails of pod station 801 (not shown) and rails 804 of mobile robotic chassis 803 align with one another. In FIG. 8D, middle part 805 of mobile robotic chassis 803 is unlocked and moved as far as possible in a direction towards transfer part 802 (not shown) and is locked in place. Middle part 805 can be moved in a similar way as transfer part 802. Top pins 806 of middle part 805 are retracted to prepare for loading of pod 800. In FIG. 8E, pod 800 is moved in a direction towards middle part 805 such that pod 800 is equally supported by transfer part 802 (not shown) and middle part 805. Once in place, top pins of middle part 805 are extended and pod 800 is locked in place.

Figure 8G:
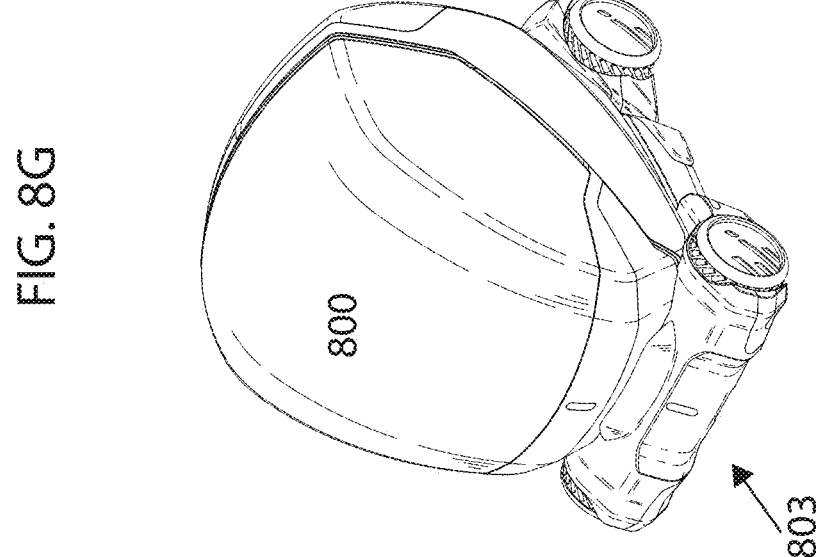

In FIG. 8F, transfer part 802 (not shown) and middle part 805 simultaneously move in a direction away from pod station 801 until pod 800 has been loaded onto mobile robotic chassis 803. Front and back pins of transfer part 802 (not shown) are retracted one by one as transfer part 802 is transferred from pod station 501 to mobile robotic chassis 803. Once each pin of transfer part 802 is adjacent with a rail of mobile robotic chassis 803 they are extended once again. In FIG. 8G, pod 800 is loaded onto mobile robotic chassis 803 and is used for, for example, transportation of items or humans or animals. In this example, transfer part 802 and middle part 805 are of the same design, however, in other embodiments they can be of different design.

Figure 9A:
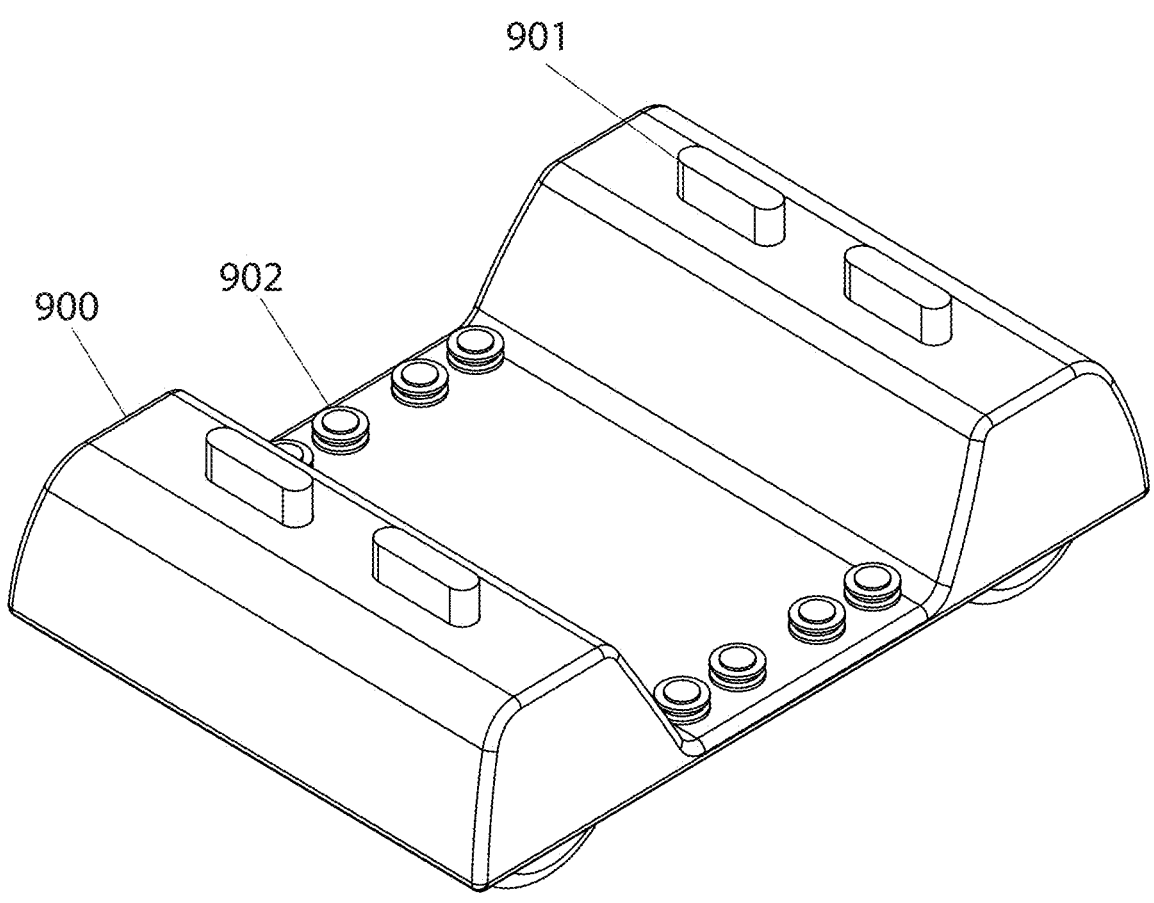
Figure 9B:
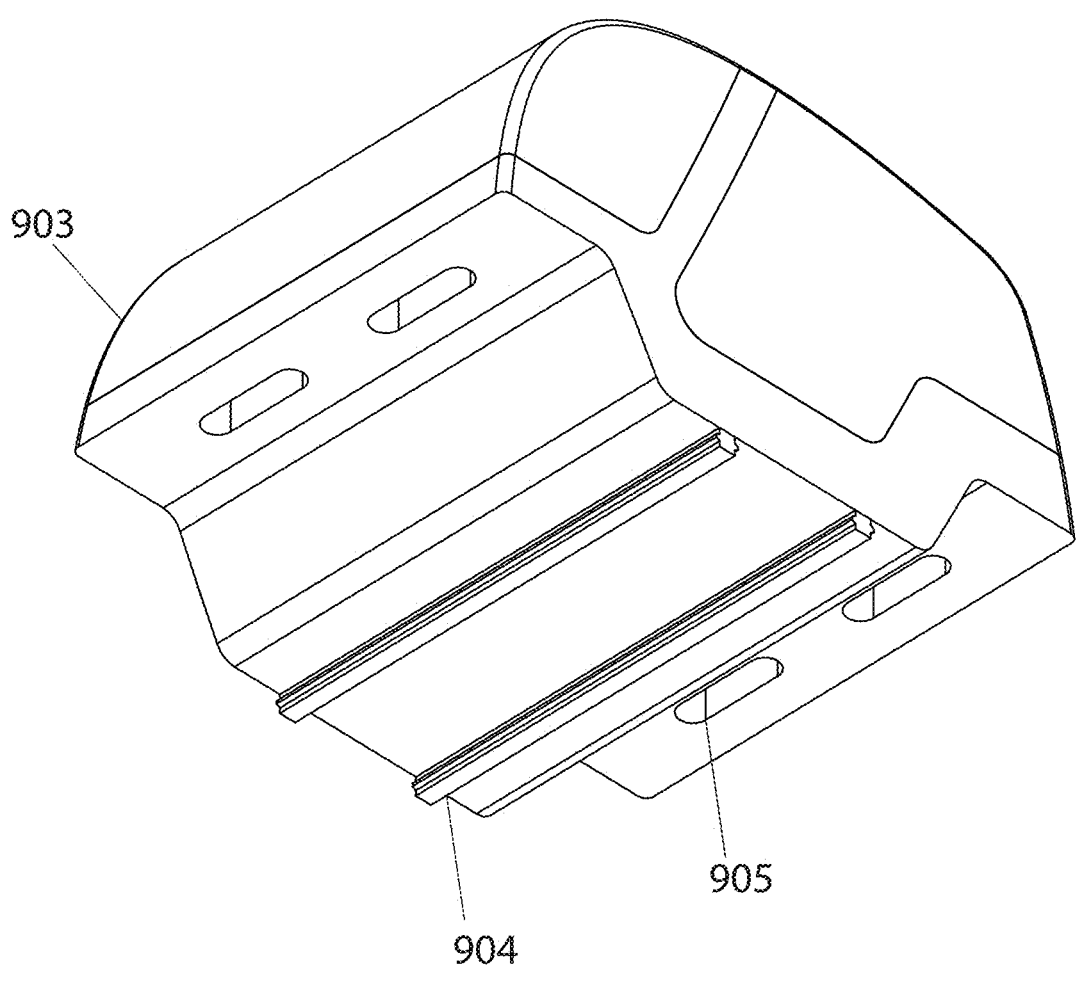
Figures 9C, 9D:
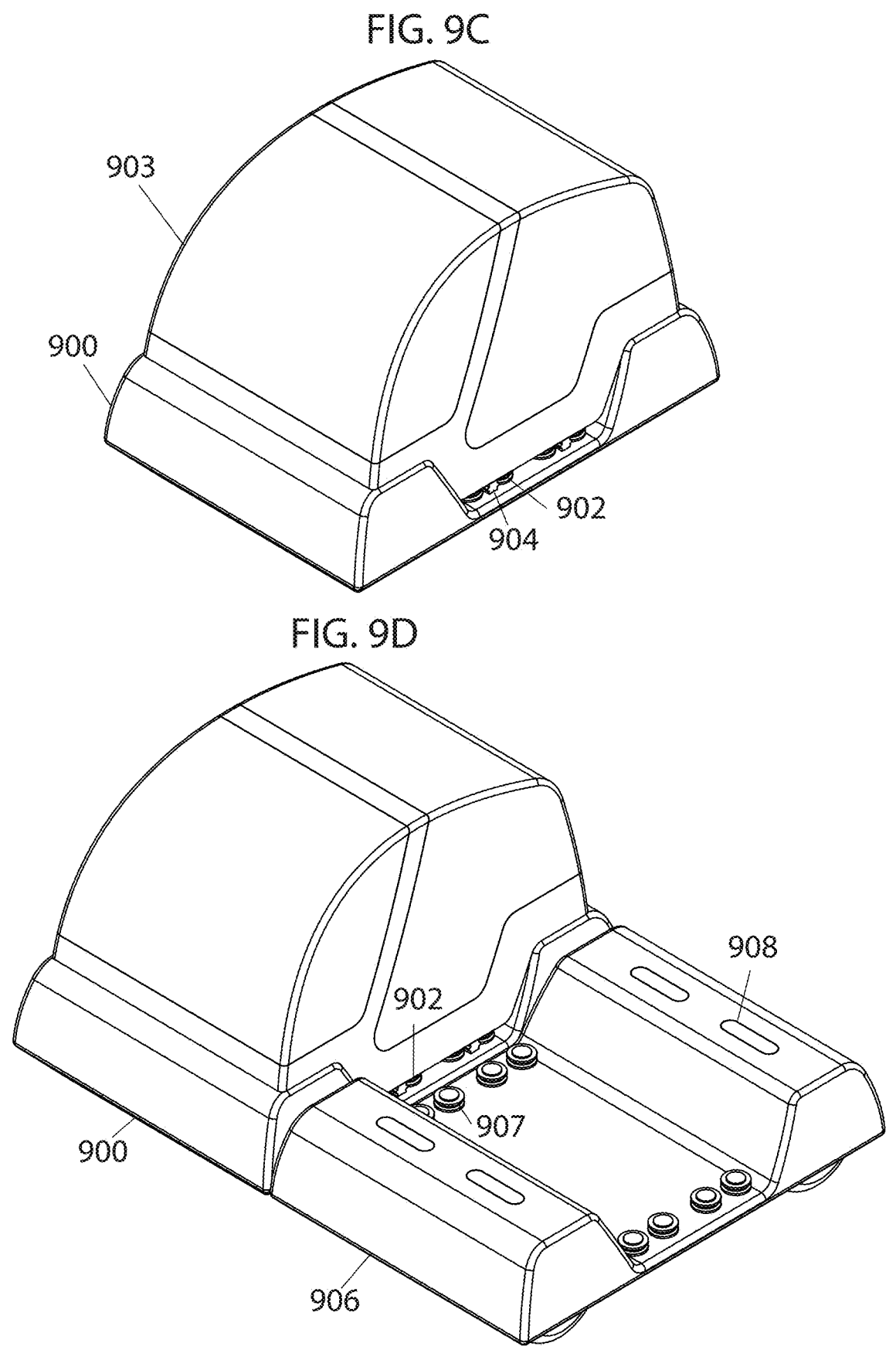
Figures 9E, 9F:
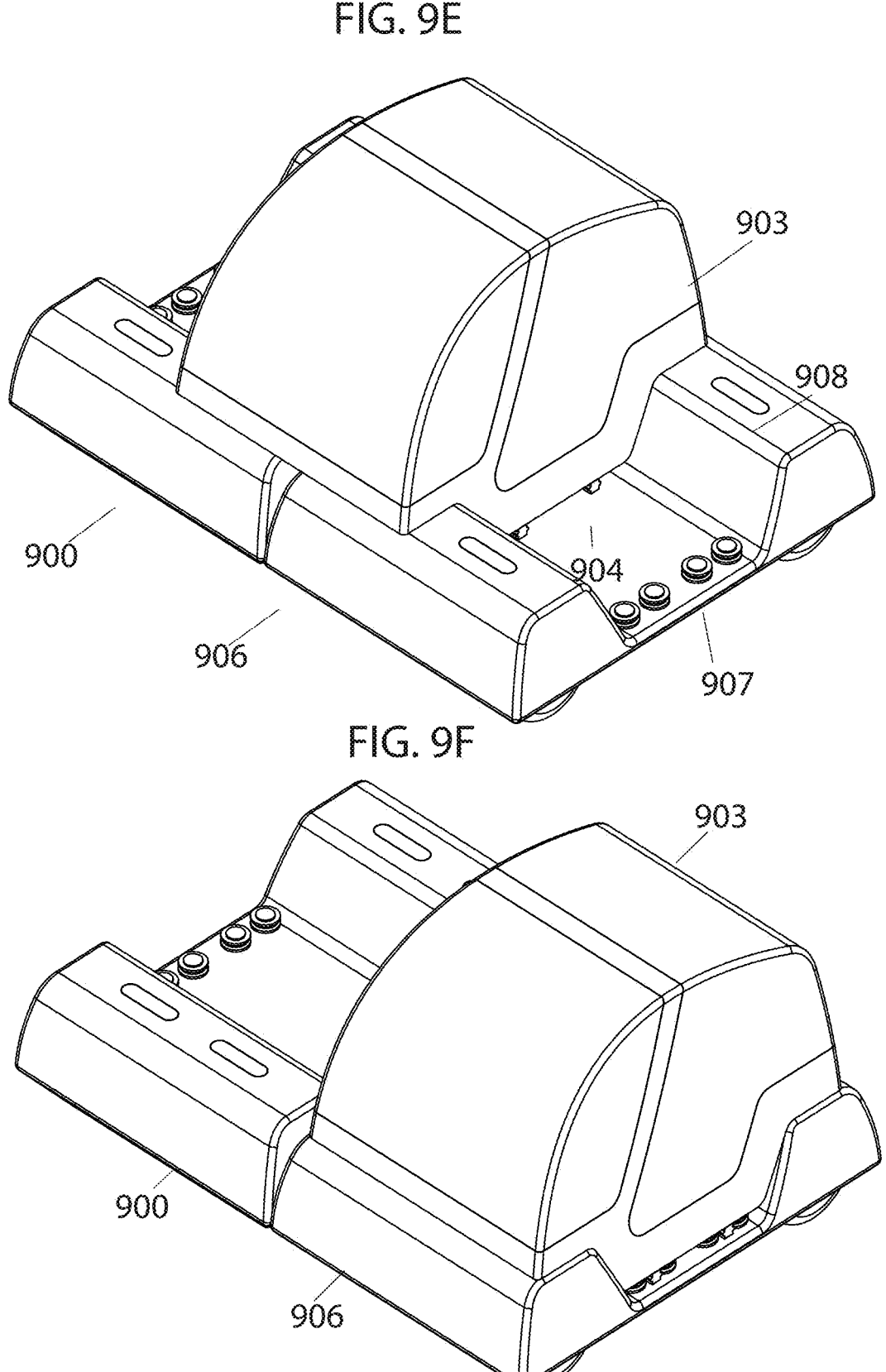

In other embodiments, different types loading and unloading mechanisms can be used. For example, a pod includes two (or more) rails positioned along the width of a bottom side the pod and a pod station and mobile robotic chassis each include eight guiding pins, four guiding pins positioned on either side of the pod station and mobile robotic chassis such that the two rails of the pod fit within and are guided by two pins on both sides and both ends of each rail (i.e., total of four pins per rail). In some embodiments, the pod station and robotic chassis include a locking mechanism. In some embodiments, the locking mechanism includes locking pins of the pod station and robotic chassis that extend into holes positioned on the pod to hold the pod in place. In some embodiments, the pins retract during pod transfer. In some embodiments, the locking pins are driven by one or more motors. In some embodiments, the guiding pins include teeth and rotate and the rails include grooves within which the teeth fit within such that rotation of the guiding pins causes linear sideways movement of the pod. In some embodiments, rollers placed elsewhere cause linear movement of the pod. In some embodiments, a robotic chassis aligns with a side of a pod station holding a pod. The robotic chassis is aligned with the pod station when the guiding pins of the robotic chassis and the pod station are aligned. In some embodiments, the pod station and robotic chassis retract their respective locking pins. The pod is transferred from the pod station to the robotic chassis by moving towards the robotic chassis, the rails of the pod fitting between the guiding pins of the robotic chassis. The transfer is complete when the pod is aligned with robotic chassis and the locking pins of the robotic chassis are extended. In other embodiments, a similar process is executed for transfer of the pod from a robotic chassis to a pod station or from one robotic chassis to another. FIGS. 9A-9F illustrate an example of the loading and unloading mechanism. FIG. 9A illustrates pod station 900 with locking pins 901 extended and guiding pins 902. FIG. 9B illustrates pod 903 with rails 904 that fit within guiding pins 902 (shown in FIG. 9A) and holes 905 within which locking pins 901 (shown in FIG. 9A) fit within. FIG. 9C illustrates pod 903 in pod station 900 with rails 904 positioned between guiding pins 902. FIG. 9D illustrates mobile robotic chassis 906 aligned with pod station 900 as guiding pins 902 of pod station 900 are aligned with guiding pins 907 of robotic chassis 906. FIG. 9E illustrates the transfer of pod 903 from pod station 900 to robotic chassis 906 as pod 903 moves sideways towards robotic chassis 906 and is guided by rails 904 fitting within guiding pins 907 of robotic chassis 906. Locking pins 901 (not shown) of pod station 900 and locking pins 908 of robotic chassis 906 are retracted during pod transfer. FIG. 9F illustrates pod 903 in robotic chassis 906 after transfer is complete. Although not shown, locking pins 908 of robotic chassis 906 are extended to lock pod 903 in place. In some embodiments, the processor of the mobile robotic chassis detects alignment between the mobile robotic chassis and pod station when a receiver positioned on the mobile robotic chassis receives a signal from a transmitter positioned on the pod station, wherein the transmitter and receiver are positioned such that the receiver only receives the signal when the mobile robotic chassis and pod station are aligned. In some embodiments, the pod station detects alignment in a similar manner. In some embodiments, the processors of the mobile robotic chassis and pod station actuate their respective locking pins to retract and their respective guiding pins to rotate once alignment between the mobile robotic chassis and pod station is detected causing the pod to transfer from the pod station to mobile robotic chassis. In some embodiments, the release or activation of a switch is used to indicate unloading or loading of the pod is complete.

In another example of a loading and unloading mechanism, a pod is slidingly coupled with rollers of a pod station and a mobile robotic chassis. In some embodiments, the pod station and mobile robotic chassis each include eight (or more) rollers with teeth, four rollers positioned in a straight line along the length of the pod station and mobile robotic chassis on both sides. In some embodiments, the rollers are operated using one or more motors. In some embodiments, the pod includes two (or more) rails with grooves positioned on a bottom side of the pod. In some embodiments, the rollers of the pod station and mobile robotic chassis align with the rails of the pod and the teeth of the rollers fit within the grooves of the rails such that when the rollers rotate they cause linear motion of the pod in a direction of rotation of the rollers. In some embodiments, the rollers and rails operate in a similar manner as a rack and pinion gear system. In some embodiments, the pod station and mobile robotic chassis include a locking mechanism. In some embodiments, a locking mechanism includes locking pins driven by a motor wherein locking pins extend from the pod station or mobile robotic chassis into holes positioned on the pod to lock the pod into place. In some embodiments, the locking pins extend from the pod station into holes in the rails of the pod to lock the pod into place. In some embodiments, the locking pins extend from the pod station into holes positioned at the sides of the pod to lock the pod in place. In some embodiments, other locking configurations are possible. In some embodiments, the pod is located at a pod station when the pod is not required. In some embodiments, a mobile robotic chassis aligns itself in front or behind the pod station such that the pod can be loaded onto the mobile robotic chassis when the pod is required. In some embodiments, the mobile robotic chassis is aligned with the pod station when the rollers of the mobile robotic chassis and rollers of the pod station are aligned with one another. In some embodiments, the rollers of the pod station rotate and move the pod linearly towards the robotic chassis as teeth of the rollers fit into the grooves of the rails of the pod. In some embodiments, the rollers of the mobile robotic chassis rotate as well to move the pod linearly until it is aligned with the robotic chassis. In some embodiments, the locking pins retract when transferring the pod from the pod station to the mobile robotic chassis and extend into the pod once the pod is aligned with the mobile robotic chassis. In some embodiments, a similar operation is executed to transfer the pod from the robotic chassis to a pod station or from one robotic chassis to another robotic chassis.

Figure 10A:
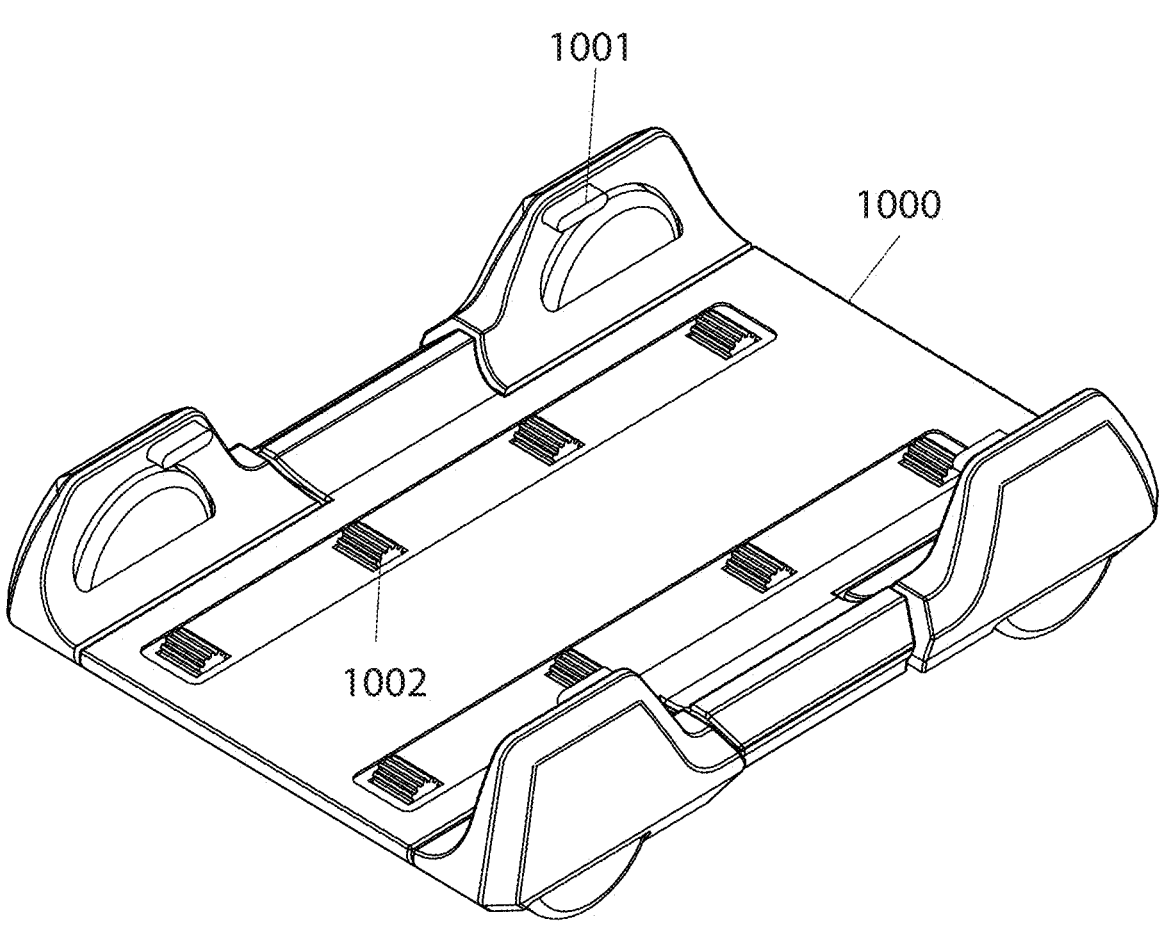
FIGS. 10A-10F illustrate an example of a sequence of steps for loading a pod onto a mobile robotic chassis according to some embodiments.
Figure 10B:
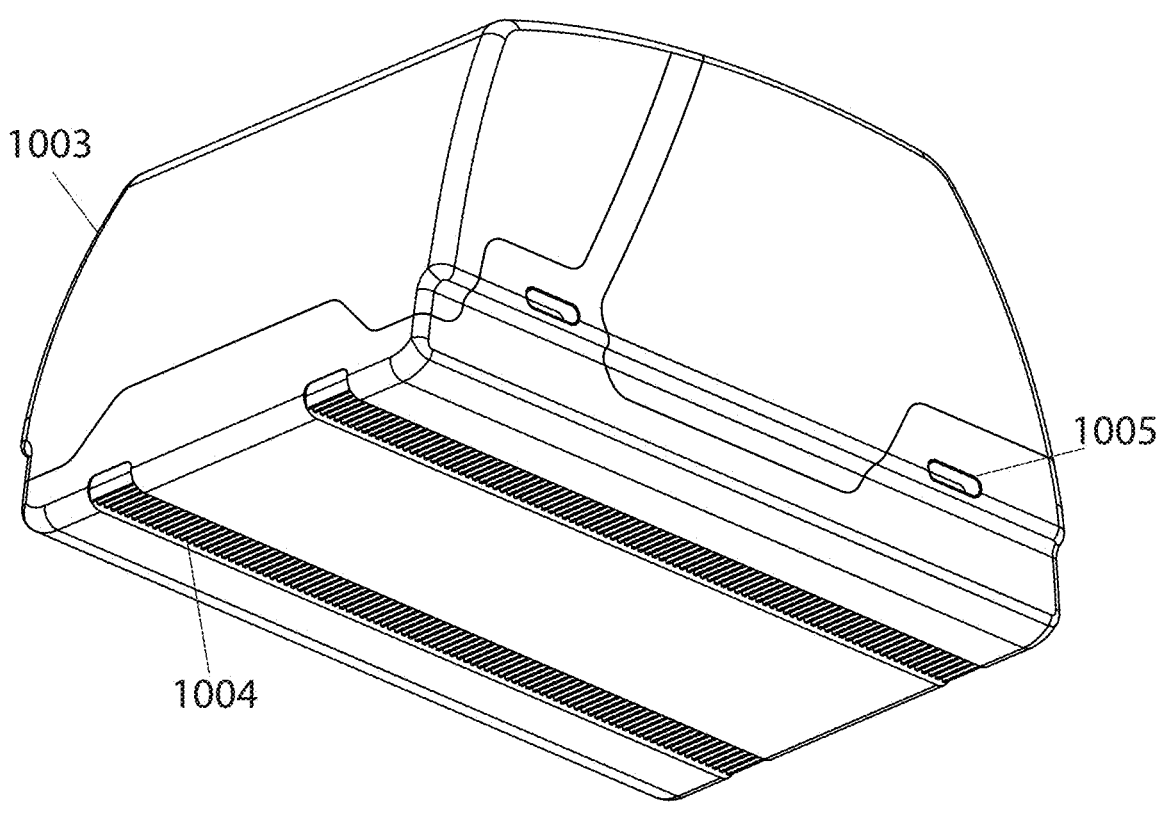
Figures 10C, 10D:
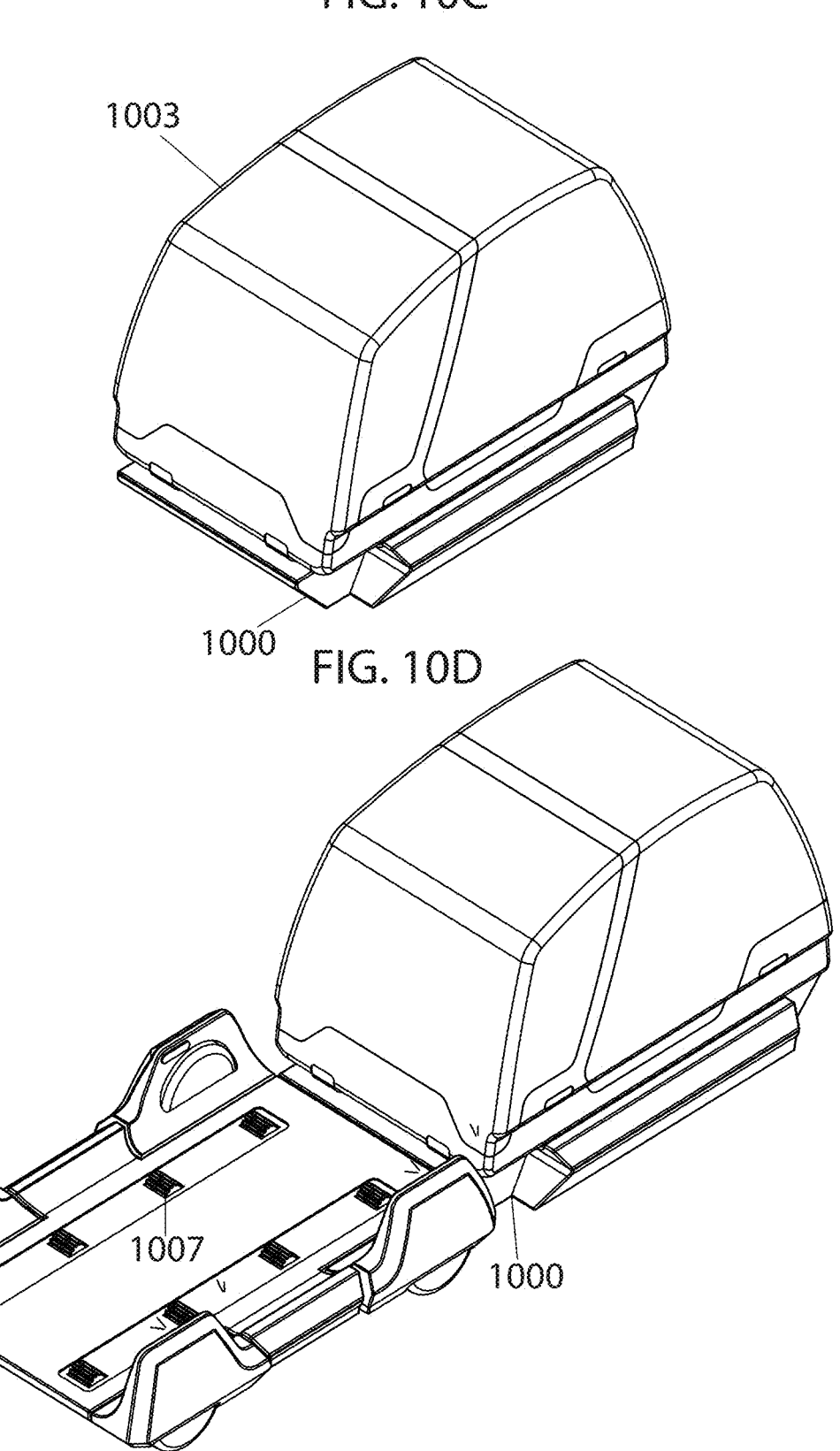
Figures 10E, 10F:
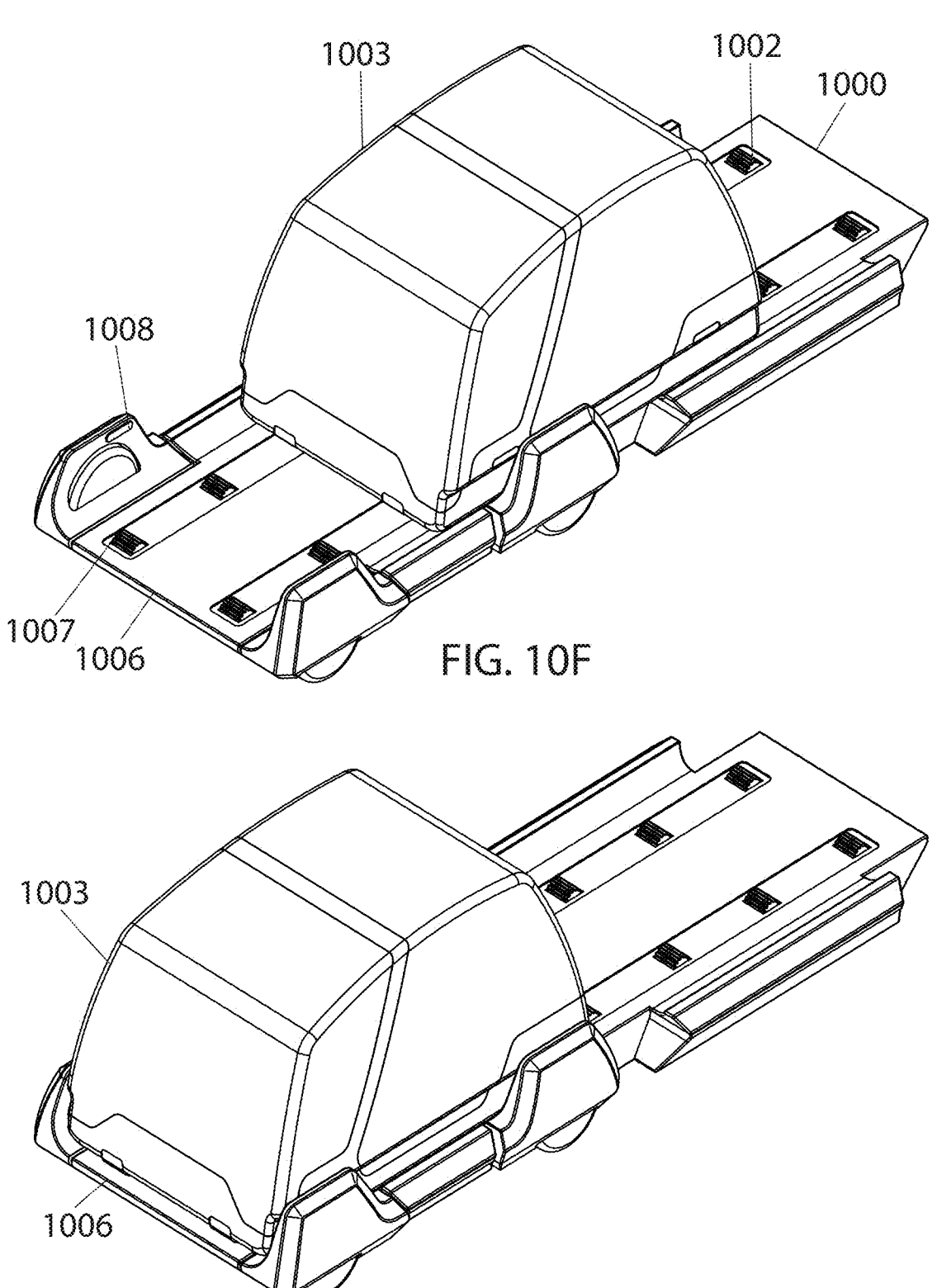

In some embodiments, rails and rollers have different configurations (e.g., orientation, position, etc.). For example, the rails and rollers are oriented along the width of the pod, and pod station and mobile robotic chassis, respectively, such that the pod is transferred by sliding towards a side of the pod station or robotic chassis. FIGS. 10A-10F illustrate an example of the roller and rail loading and unloading mechanism. FIG. 10A illustrates pod station 1000 with locking pins 1001 extended and rollers with teeth 1002. FIG. 10B illustrates pod 1003 with grooved rails 1004 within which teeth of rollers 1002 (shown in FIG. 10A) fit within and holes 1005 within which locking pins 1001 (shown in FIG. 10A) fit within. FIG. 10C illustrates pod 1003 in pod station 1000. FIG. 10D illustrates mobile robotic chassis 1006 aligned with pod station 1000 as rollers 1002 of pod station 1000 are aligned with rollers 1007 of robotic chassis 1006. FIG. 10E illustrates the transfer of pod 1003 from pod station 1000 to robotic chassis 1006 as pod 1003 moves forwards towards robotic chassis 1006 as rollers 1002 (shown in FIG. 10A) of pod station 1000 and rollers 1007 of robotic chassis 1006 rotate in a counter clock wise direction and their teeth fit within grooves of rails 1004 (not shown) of pod 1003, moving it linearly forward. Locking pins 1001 of pod station 1000 (not shown) and locking pins 1008 of robotic chassis 1006 are retracted during pod transfer. FIG. 10F illustrates pod 1003 in robotic chassis 1006 after transfer is complete. Although not shown, locking pins 1008 of robotic chassis 1006 are extended to lock pod 1003 in place.

In some embodiments, a pod is transferred from one robotic chassis to another while stationary or while operating using similar loading and unloading mechanisms described above. In some embodiments, a first mobile robotic chassis with a pod, the pod being coupled to a transfer part coupled to the front and rear of the robotic chassis, aligns adjacent to a second mobile robotic chassis. In some embodiments, the first mobile robotic chassis is aligned with the second mobile robotic chassis when the middle part of the first mobile robotic chassis and the middle part of the second mobile robotic chassis, and hence the rails of the first mobile robotic chassis and second mobile robotic chassis, are aligned with one another. In some embodiments, the transfer part coupled to the pod slides along the rails of the first mobile robotic chassis towards the second mobile robotic chassis until the transfer part is coupled to front and rear rails of the second mobile robotic chassis. In some embodiments, the first mobile robotic chassis with pod is low on battery at which point the second mobile robotic chassis aligns itself with the first mobile robotic chassis to load the pod onto the second mobile robotic chassis and complete the transportation. In some embodiments, the first pod with low battery navigates to the nearest charging station.

In some embodiments, the size of a mobile robotic chassis is adjusted such that two or more pods can be transported by the robotic chassis. In some embodiments, pods are of various sizes depending on the item or number of persons to be transported within the pods. In some embodiments, robotic chassis are of various sizes to accommodate pods of various sizes. In some embodiments, two or more pods link together to transport larger items and the required number of mobile robotic chassis are coupled to the two or more linked pods for transportation. In some embodiments, two or more mobile robotic chassis link together to form a larger vehicle to, for example, transport more items or passengers or larger items. In some embodiments, pods and/or mobile robotic chassis temporarily link together during execution of a task for, for example, reduced power consumption (e.g., when a portion of their paths are the same) or faster travel speed. In some embodiments, two or more robotic chassis without loaded pods stack on top of one another to minimize space (e.g., when idle or when a portion of their routes match). In some embodiments, the two or more robotic chassis navigate to a stacking device capable of stacking robotic chassis by, for example, providing a lift or a ramp.

In some embodiments, a processor of a mobile robotic chassis inspects a pod for physical damage using computer vision technology and displays any discovered damages on a screen of the pod. In some embodiments, the processor of the mobile robotic chassis uses imaging devices or other types of sensors to observe the pod and infers features of the pod from the observations collected by the imaging devices. In some embodiments, the processor compares the inferred features of the current pod to stored features of an undamaged pod and identifies discrepancies between the inferred features of the current pod and the stored features of an undamaged pod as physical damage. In other embodiments, other methods may be used to detect physical damage. In some embodiments, the severity level of the damage is displayed on the screen of the pod. In some embodiments, the damage and the severity of damage are sent to an application of a communication device paired with the pod.

Figure 11:
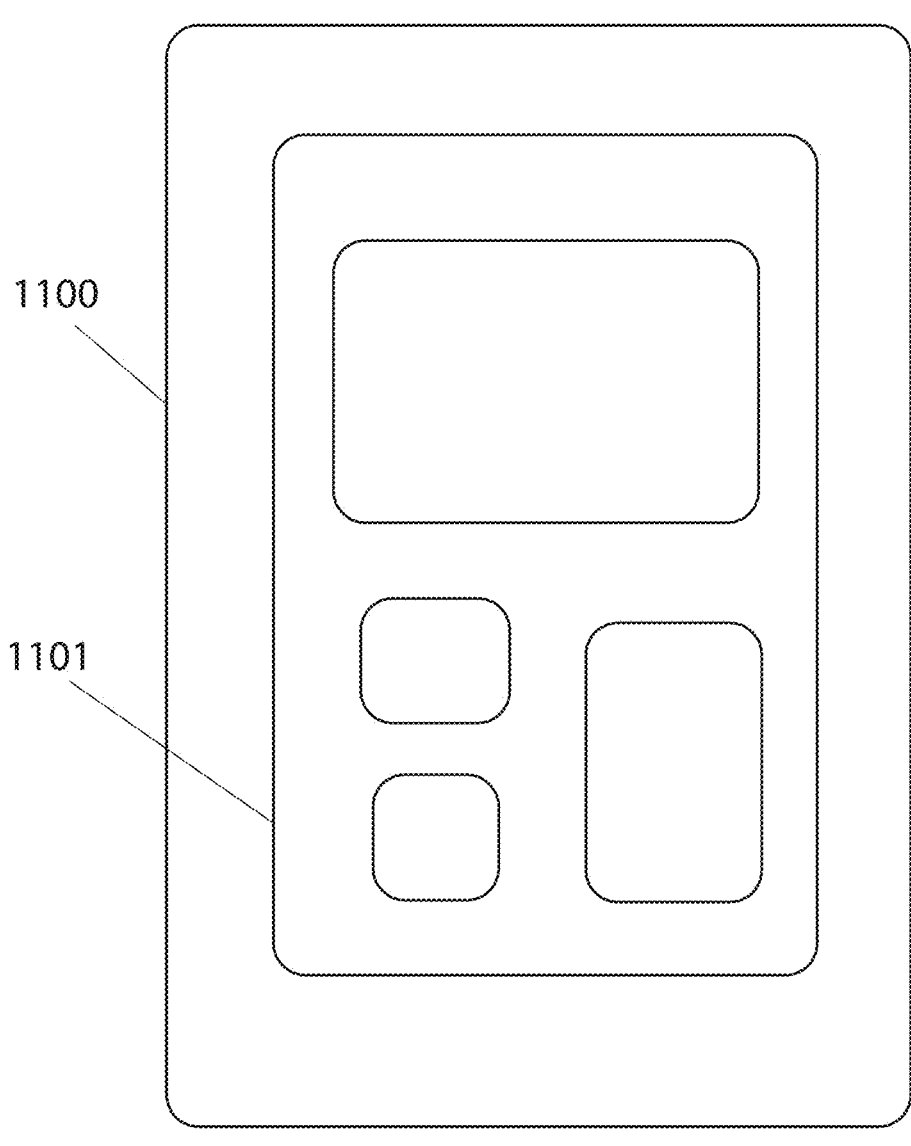
FIG. 11 illustrates an example of a communication device according to some embodiments.

In some embodiments, an application of a communication device is paired with a control system that manages multiple mobile robotic chassis. In some embodiments, the application of the communication device is paired with a robotic chassis upon loading of a pod or selection of the robotic chassis to provide the service. In some embodiments, a pod is paired with a robotic chassis upon loading. In some embodiments, pairing methods such as those described in U.S. patent application Ser. No. 16/109,617, the entire contents of which are hereby incorporated by reference, are used to wirelessly pair pods, robotic chassis, and applications of communication devices. Examples of communication devices include, but are not limited to, a mobile phone, a tablet, a laptop, a remote control, and a touch screen of a pod. In some embodiments, the application of the communication device transmits a request to the control system for a mobile robotic chassis for a particular function (e.g., driving service, food delivery service, item delivery service, plowing service, etc.). For example, the application of the communication device requests a mobile robotic chassis for transportation of persons or items (e.g., food, consumer goods, warehouse stock, etc.) in a pod (i.e., a driving service) from a first location to a second location. In another example, the application of the communication device requests snow removal in a particular area at a particular time or garbage pickup at a particular location and time or for a vehicle tow from a first location to a second location immediately. In some embodiments, the application of the communication device is used to designate a pickup and drop off location and time, service location and time, service type, etc. In some embodiments, the application of the communication device is used to set a schedule for a particular function. For example, the application of the communication device is used to set a schedule for grocery pickup from a first location and delivery to a second location every Sunday at 3 pm by a robotic chassis customized to transport items such as groceries. Examples of methods for setting a schedule are described in U.S. patent application Ser. Nos. 16/051,328 and 15/449,660, the entire contents of which are hereby incorporated by reference. In some embodiments, the application of the communication device provides information relating to the robotic chassis performing the function such as battery level, average travel speed, average travel time, expected travel time, navigation route, current location, drop off location, pick up location, etc. In some embodiments, some parameters are modified using the application of the communication device. For example, a navigation route or travel speed or a delivery location of a robotic chassis delivering food is modified using the application of the communication device. In some embodiments, the current location, pickup location, drop off location, and navigation route of the mobile robotic chassis is viewed in a map using the application of the communication device. In some embodiments, the application also provides an estimated time of arrival to a particular location and cost of the service if applicable. In some embodiments, the application of the communication device includes a graphical user interface such as the GUI described in U.S. patent application Ser. Nos. 15/272,752 and 15/949,708, the entire contents of which are hereby incorporated by reference. In some embodiments, the application of the communication device is a downloaded application, a web application or a downloaded software. FIG. 11 illustrates an example of a communication device 1100 with graphical user interface 1101 that a user may use to adjust settings of or provide instructions to a mobile robotic chassis or pod. Communication device 1100 may be paired and communicate with a pod, robotic chassis or control system using, for example, a pairing method similar to the pair method described in U.S. patent application Ser. No. 16/109,617, the entire contents of which are hereby incorporated by reference.

In some embodiments, the application of the communication device is used to request a robotic chassis customized for transportation of pods within which persons or items are transported (e.g., FIGS. 3-10). In other embodiments, the application of the communication device is used to request a robotic chassis customized for other functions, such as towing or snow removal. In some embodiments, the robotic chassis is requested to meet at a location of the pod (e.g., a garage, a designated parking area, etc.) or at a service location (e.g., location of a vehicle needing towing, location of an area requiring snow removal, etc.). In some embodiments, persons navigate the robotic chassis from within the pod while in other embodiments, the robotic chassis autonomously navigates. In some embodiments, the mobile robotic chassis includes a user activated voice command such that operational commands, such as those related to direction, speed, starting and stopping, can be provided verbally. In some embodiments, the mobile robotic chassis determines a navigation route using methods such as those described in U.S. patent application Ser. Nos. 16/041,286, 15/406,890, and 14/673,633, the entire contents of which are hereby incorporated by reference. In one example, the mobile robotic chassis leaves a parking area and navigates to a location of a pod, loads the pod onto the chassis, transports items or passengers within the pod to a requested drop off location, unloads the pod at a nearby pod station or at the pickup location of the pod, then navigates back to the parking area and autonomously parks. In another example, the robotic chassis leaves its designated parking area and navigates to a location of a pod, loads the pod onto the chassis from a pod station, transports passengers within the pod to a requested parking area, autonomously parks, navigates back to the pickup location of the pod, unloads the pod into the pod station, and navigates back to its designated parking area (or closest robotic chassis parking area) until requested for another task. In some embodiments, robotic chassis are permanently equipped with pods for transportation of items or persons. In some embodiments, robotic chassis load a pod along their route to a requested pickup location. In some embodiments, robotic chassis load the nearest available pod located along a route to the pickup location. In some embodiments, wherein all pods along a route to the pickup location are unavailable or nonexistent, the route is altered such that the mobile robotic chassis passes a location of the nearest available pod. In another example, the mobile robotic chassis leaves a parking area and navigates to a service location (e.g., location of a vehicle requiring a tow), performs the service (e.g., tows the vehicle from a first location to a second location), then navigates back to the parking area and autonomously parks. In some embodiments, the application of the communication device is used to select one or more pick up or drop off locations and times, travel speed, audio level, air temperature, seat temperature, route, service schedule, service type, etc. In some embodiments, the application of the communication device provides information such as the payload, battery level, wheel pressure, windshield washer fluid level, average travel speed, current speed, average travel time, expected travel time, navigation route, traffic information, obstacle density, etc. In some embodiments, functions and settings available through the application of the communication device varies depending on the customization of the mobile robotic chassis requested.

In some embodiments, a mobile robotic chassis completes a service or task when completion of the service or task is confirmed by the application of the communication device whereby the application communicates the completion to a processor of the robotic chassis or a control system managing the robotic chassis (which then relays the information to the processor of the robotic chassis). In some embodiments, a mobile robotic chassis completes a service or task when completion of the service or task is confirmed by activating a button or switch positioned on the robotic chassis. In some embodiments, a mobile robotic chassis completes a service or task when completion of the service or task is confirmed by scanning of a barcode positioned on the robotic chassis whereby the scanner communicates the completion to a processor of the robotic chassis or a control system managing the robotic chassis (which then relays the information to the processor of the robotic chassis). In some embodiments, a processor of mobile robotic chassis or a control system managing a mobile robotic chassis autonomously detects completion of a task or service using sensors, such as imaging devices (e.g., observing position at a particular location such as tow yard), weight sensors (e.g., delivery of persons or items is complete when the weight has decreased by a particular amount), and inertial measurement units (e.g., observing coverage of roads within a particular area for tasks such as snow plowing or sweeping). In some embodiments, a processor of mobile robotic chassis or a control system managing a mobile robotic chassis autonomously detects completion of a task or service after being located at a final drop off location for a predetermined amount of time.

In some embodiments, a control system manages mobile robotic chassis (e.g., execution tasks and parking in parking areas) within an environment by monitoring and providing information and instructions to all or a portion of mobile robotic chassis. An example of such a control system that manages robotic devices is described in U.S. patent application Ser. No. 16/130,880, the entire contents of which is hereby incorporated by reference. In some embodiments, the control system receives all or a portion of sensor data collected by sensors of a mobile robotic chassis from a processor of the mobile robotic chassis and from sensors fixed within the environment. In some embodiments, sensor data includes (or is used by the control system to infer) environmental characteristics such as road conditions, weather conditions, solar conditions, traffic conditions, obstacle density, obstacle types, road type, location of perimeters and obstacles (i.e., a map), and the like. In some embodiments, sensor data includes (or is used by the control system to infer) information relating to the function and operation of a robotic chassis such as the weight of any transported item or person, number of items being transported, travel speed, wheel conditions, battery power, solar energy, oil levels, wind shield fluid levels, GPS coordinates, fuel level, distance travelled, vehicle status, etc. In some embodiments, the control system receives information for all or a portion of robotic chassis within the environment relating to a current operation being executed, upcoming operations to execute, scheduling information, designated storage or parking location, and hardware, software, and equipment available, etc. from processors of all or a portion of robotic chassis.

In some embodiments, the control system evaluates all or a portion of sensor data received and all or a portion of information pertaining to the mobile robotic chassis in choosing optimal actions for the robotic chassis. For example, a control system managing mobile robotic chassis customized to transport passenger pods receives wheel condition information indicating a tire with low pressure from a processor of a mobile robot chassis transporting passengers in a passenger pod. The control system determines that the robotic chassis cannot complete the transportation and instructs the robotic chassis to stop at a particular location and instructs another available nearby robotic chassis to load the pod and pick up the passengers at the particular location and complete the transportation. In another example, a control system instructs a processor of a mobile robotic chassis to modify its route based on continuous evaluation of traffic data received from various sensors of mobile robotic chassis and fixed sensors within the environment. In another instance, a control system instructs a processor of a mobile robotic chassis to modify its route based on continuous evaluation of road condition data received from various sensors of mobile robotic chassis and fixed sensors within the environment.

In some embodiments, the control system receives all or a portion of requests for mobile robotic chassis services from, for example, an application of a communication device paired with the control system, and instructs particular mobile robotic chassis to respond to the request. For example, the application of the communication device requests the control system to provide instructions to a mobile robotic chassis to plow a driveway at a particular location on Monday at 1 pm. In one example, the application of the communication device requests the control system to provide instructions to a mobile robotic chassis to tow a four-wheeler from a first location to a second location immediately and to drive along a particular route. In another example, the application of the communication device requests the control system to provide immediate instruction to a mobile robotic chassis to pick up an item at a provided pick up location and drop off the item at a provided drop off location and to drive at a speed of 60 km/h when executing the task. In some embodiments, the control system instructs the closest mobile robotic chassis equipped with the necessary hardware, software and equipment to complete the task or service. In some embodiments, the control system instructs mobile robotic chassis to park in a particular parking area after completion of a task. In some embodiments, the application of the communication device is used to monitor one or more robotic chassis managed by the control system. In some embodiments, the application of the communication device is used to request the control system to provide instructions to or modify settings of a particular mobile robotic chassis.

In some embodiments, a mobile robotic chassis alerts a control system when an unanticipated obstacle blocking a path of the robotic chassis is encountered, particularly when the robotic chassis cannot overcome the obstacle by maneuvering around or driving over the obstacle. In some embodiments, the processor of the robotic chassis or the control system alerts a user by sending a message to an application of a communication device paired with the robotic chassis or the control system, generating a noise, displaying a message on a screen of the robotic chassis or pod, illuminating lights, and the like. In some embodiments, the control system or the application of the communication device is used to instruct the robotic chassis to carry and transport the obstacle to a particular location and in some cases, unload the obstacle.

In some embodiments, the control system has an action queue for each mobile robotic chassis that stores a sequence of actions to be executed (e.g., drive to a particular location, load/unload a particular pod, charge battery, etc.). In some embodiments, the control system iterates in a time step manner. In some embodiments, the time step structure, in the particular case of a control system managing robotic chassis customized to transport pods, includes: checking, for running tasks, if corresponding pods are at their final destination, and if so, removing the tasks, and finding suitable robotic chassis for pods corresponding to new tasks, and adding the required actions to the suitable chassis action queues (e.g. drive to pod, load the pod, drive to final destination, and unload pod); checking the top of the action queue for all robotic chassis and if the action is to load/unload a pod, executing the action; handling special cases such as, robotic chassis with low battery level, critical battery level, or idle; computing a next action for robotic chassis that have a driving action at the top of their queue; and, checking the top of the action queue for all robotic chassis and if the action is to load/unload a pod, executing the action. In some embodiments, similar time step structure is used for robotic chassis customized for other functions.

In some embodiments, the control system uses a graph $G=(V, E)$ consisting of a set of nodes $V$ and a set of edges $E$ to compute the next action for a robotic chassis that has a driving action at the top of their queue. Nodes represent locations within the environment and are connected by edges, the edges representing a possible driving route from one node to another. In some embodiments, the control system uses an undirected graph wherein edges have no orientation (i.e., the edge $(x, y)$ is identical to the edge $(y, x)$), particularly in cases where all roads in the environment are two-way. In some cases, not all roads are two-way (e.g. one-ways), therefore, in some embodiments, the control system uses a directed graph where directed edges indicate travel in one direction (i.e. edge $(x, y)$ allows travel from node x to y but not vice versa). In some embodiments, the control system assigns each edge a weight corresponding to the length of the edge. In some embodiments, the control system computes the next driving action of a robotic chassis navigating from a first location to a second location by determining the shortest path in the directed, weighted graph. In other embodiments, the weight assigned to an edge depends on one or more other variables such as, traffic within close proximity of the edge, obstacle density within close proximity of the edge, road conditions, number of available charged robotic chassis within close proximity of the edge, number of robotic chassis with whom linking is possible within close proximity of the edge, etc.

In some embodiments, the control system uses the number of robotic chassis with whom linking is possible in determining the next driving action of a robotic chassis as linking multiple chassis together reduces battery consumption and travel time. Further, reduced battery consumption increases the range of the linked robotic chassis, the availability of robotic chassis, and the number of pod transfers between robotic chassis. Thus, in some situations a slightly longer (time and distance) route is preferable. In some embodiments, the control system estimates battery consumption. For example, the control system may use a discount factor $\alpha(n)$, wherein n represents the number of chassis linked. The discount factor for different numbers of linked robotic chassis may be provided below as shown below:

$$\alpha(n) = \begin{cases} 1, & \text{if } n = 1 \\ 0.8, & \text{if } n = 2 \\ 0.6, & \text{if } n = 3 \end{cases}$$

Therefore, for two robotic chassis linked together (n=2), the battery consumption of each chassis is only 80% the normal battery discharge. In some embodiments, the control system solves the optimal route for reducing battery consumption using the strong product of graph G. In other embodiments, the control system checks the vicinity of a robotic chassis for other robotic chassis navigating in a similar direction. In some embodiments, the control system links two robotic chassis if the two are located close to one another and either their destinations are located close to one another, or the destination of one robotic chassis lies close to the travel path of the other robotic chassis. In some embodiments, the control system selects the next driving action of the robotic chassis to be along the edge that results in the minimum of the sum of distances to the destination from all edges of the current node. In some embodiments, the control system instructs the robotic chassis to unlink if the next action increases the distance to the destination for either robotic chassis.

In some embodiments, the control system computes a distance table including distances between all nodes of the graph and the control system chooses moving a robotic chassis to a neighbour node of the current node that minimizes the distance to the destination as the next driving action of the robotic chassis. In some embodiments, assuming all edge lengths are equal, the control system determines if a first robotic chassis waits for a second robotic chassis to form a link if they are within a predetermined distance from one another by: checking, when the distance between the robotic chassis is zero, if there is a neighbor node for which the distances to respective destinations of both robotic chassis decreases, and if so, linking the two robotic chassis; checking, when the distance between the two robotic chassis is one edge length, if the final destination of the first robotic chassis is roughly in the same direction as the final destination of the second robotic chassis by checking if the first robotic chassis has a neighbor node towards its final destination which also decreases the distance to the destination of the second chassis, and if so, instructing the first robotic chassis to wait for the second robotic chassis to arrive at its node, the second robotic chassis to travel to the node of the first robotic chassis and both robotic chassis to link; and, checking, when the distance between the two robotic chassis is two edge lengths, if the first robotic chassis is located along a path of the second robotic chassis, and if so, instructing the first robotic chassis to wait for the second robotic chassis to arrive at its node and both robotic chassis to link.

Figure 12:
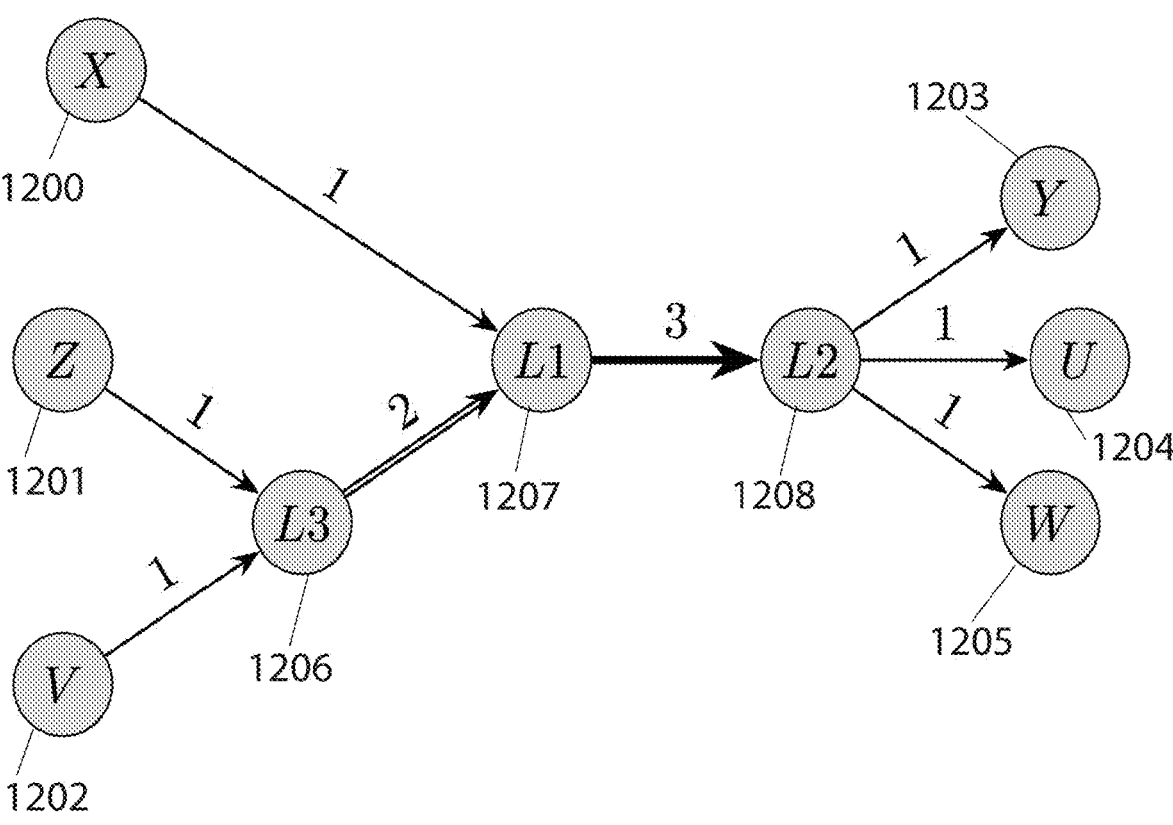
FIG. 12 illustrates an example of mobile robotic chassis paths when linking and unlinking together according to some embodiments.

In some embodiments, the control system specifies the route of a mobile robotic chassis by a list of nodes that each robotic chassis passes to reach its final destination. In some embodiments, the control system chooses edges between nodes with shortest length as the driving path of the robotic chassis. In some embodiments, the control system composes route plans of robotic chassis such that they share as many edges as possible and therefore can link for travelling along shared driving paths to save battery and reduce operation time. For example, a first robotic chassis drives from node X to node Y via nodes L1 and L2 and a second robotic chassis drives from node Z to node U via nodes L1 and L2. In this example, the first and second robotic chassis link at node L1, drive linked along the edge linking nodes L1 and L2, then unlink at node L2 and the first robotic chassis drives to node Y while the second robotic chassis drives to node U. FIG. 12 illustrates paths of three robotic chassis initially located at nodes 1200 (X), 1201 (Z), and 1202 (V) with final destination at nodes 1203 (Y), 1204 (U), and 1205 (W), respectively. The robotic chassis initially located at nodes 1201 (Z) and 1202 (V) link at node 1206 (L3) and travel linked to node 1207 (L1). At node 1207 (L1), the robotic chassis initially located at node 1200 (X) links with them as well. All three linked robotic chassis travel together to node 1208 (L2), at which point the three robotic chassis become unlinked and travel to their respective final destinations.

In some embodiments, the control system minimizes a cost function to determine a route of a robotic chassis. In some embodiments, the cost function accounts for battery consumption and time to reach a final destination. In some embodiments, the control system may determine the cost C(S) of travelling along route S using:

$$C(S) = \sum_{(x \to y) \in S} c(x \to y) + \beta \sum_{i\ chassis} \Delta t_i$$

$$c(x \to y) = n\alpha(n)d(x,y)\gamma$$

wherein $c(x \to y)$ is the cost of travelling along an edge from a first node x to a second node y, n is the number of chassis linked together, $\alpha(n)$ is the discount factor for battery discharge, $d(x, y)$ is the length of the edge, y is a constant for battery discharge per distance unit, $\beta$ is a weight, $\Delta t_i$ is the time difference between the time to destination for linked chassis and the individual chassis i. In some embodiments, the control system uses individual weights $\beta_i$ with values that, in some instances, are based on travel distance. In some embodiments, the control system uses non-linear terms in the cost function. In some embodiments, the control system minimizes the cost function C(S).

In some embodiments, the control system initially chooses a route and identifies it as a current route. In some embodiments, the control system evolves the current route, and if the evolved route has a smaller cost than the current route, the evolved route becomes the current route and the previous current route is discarded. In some embodiments, the evolution of a route includes: merging driving segments of robotic chassis by finding overlaps in driving segments in a current route graph and identifying nodes where robotic chassis can link and drive the overlapping segment together and unlink; unlinking segments when, for example, a new robotic chassis begins a task nearby and splitting the robotic chassis into two groups provides more efficient routing; and, considering neighbouring nodes of start and end nodes of segments as the start and end nodes of the segments to determine if the cost lowers. In some embodiments, the control system iterates through different evolved routes until a route with a cost below a predetermined threshold is found or for a predetermined amount of time. In some embodiments, the control system randomly chooses a route with higher cost to avoid getting stuck in a local minimum.

Figure 13A:
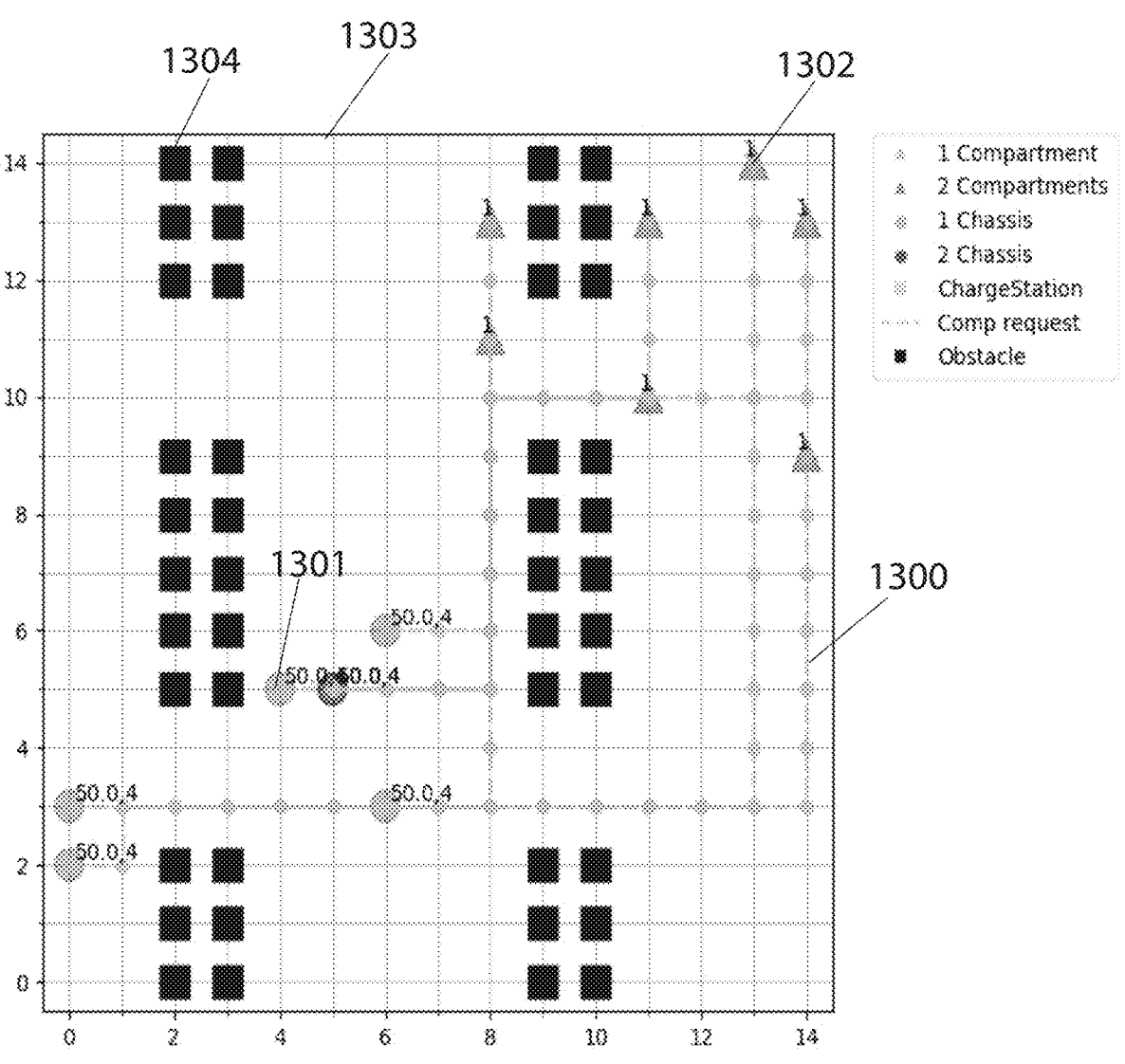
FIGS. 13A and 13B illustrate results of method for finding matching route segments between two robotic chassis according to some embodiments.
Figure 13B:
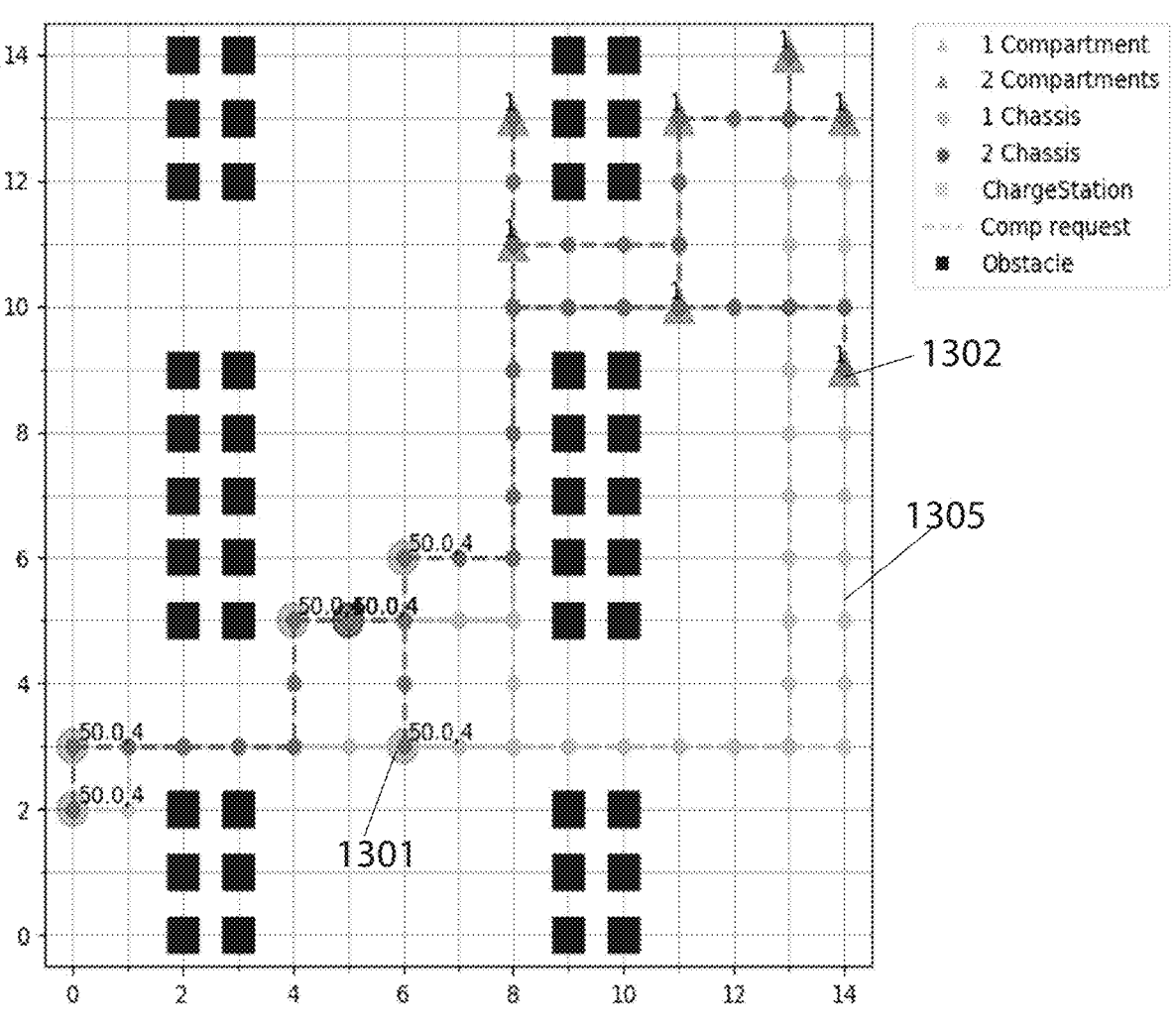

In some embodiments, the control system identifies if a pair of route segments (e.g., X→U, Y→V) match by computing an estimated cost of combined routing, and subtracting it from the cost of individual routing. The larger the difference, the more likely that the segments overlap. In some embodiments, the control system merges the route segments if the difference in combined routing and individual routing cost is greater than a predetermined threshold. In some embodiments, the estimated cost of combined routing is calculated as the minimum cost of four routing paths (e.g., X→Y→U→V; X→Y→V→U; Y→X→U→V; Y→X→V→U). FIGS. 13A and 13B illustrate an example of the implementation of the described method for matching route segments. FIG. 13A illustrates individual routes 1300 of seven robotic chassis 1301 from their current position to seven pods 1302 within environment 1303 with obstacles 1304 while FIG. 13B illustrates the updated routes 1305 to pods 1302 of robotic chassis 1301 including segments where robotic chassis are linked based on matching route segments identified using the approach described. In some embodiments, the control system identifies matching route segments of robotic chassis without pods and evaluates stacking those robotic chassis during navigation along matching route segments to minimize occupied space. In some embodiments, the control system uses a cost function to evaluate whether to stack robotic chassis. In some embodiments, the control system evaluates stacking idle robotic chassis without pods. In some embodiments, robotic chassis navigate to a stacking station to be stacked on top of one another. In some embodiments, the stacking station chosen is the stacking station that minimizes the total distance to be driven by all robotic chassis to reach the stacking station.

In some embodiments, an individual robotic chassis among a group of robotic chassis all driving along a same path is designated as a leader vehicle while the remaining robotic chassis in the group are designated follower vehicles. In some embodiments, the follower vehicles establish a connection with the leader vehicle and the leader vehicle provides intelligence to the follower vehicles. In some embodiments, the follower vehicles mimic the actions of the leader vehicle while within the driving group to automate driving of vehicles driving along the same path. An example of a method to automate driving of robotic devices driving along a same path is described in U.S. patent application Ser. No. 14/948,620, the entire contents of which is hereby incorporated by reference.

Figure 14:
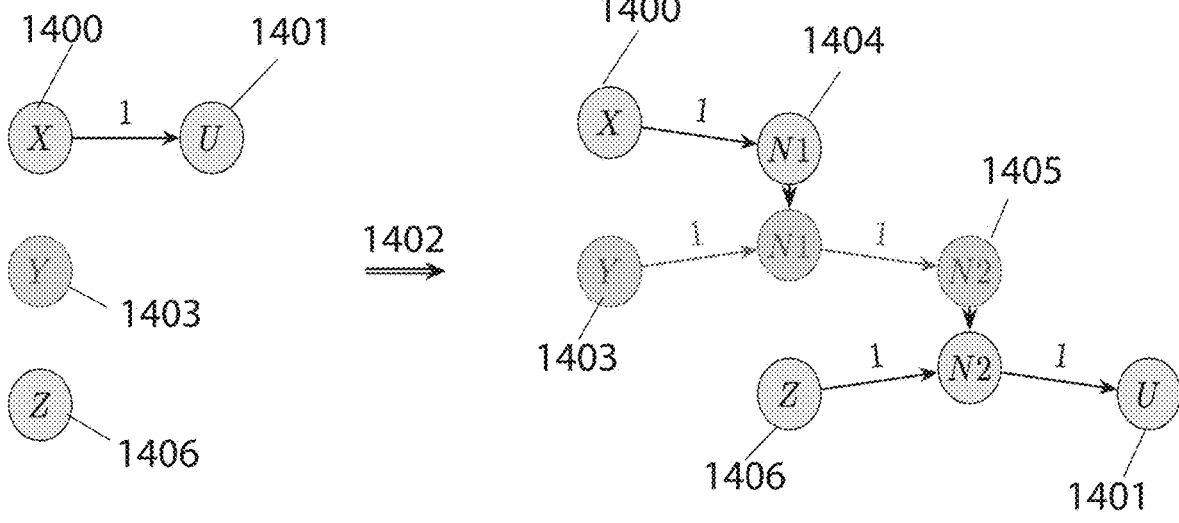
FIG. 14 illustrates an example of mobile robotic chassis paths when transferring pods between one another according to some embodiments.

In some embodiments, the control system evaluates switching robotic chassis by transferring a pod from one robotic chassis to another during execution of a route as different robotic chassis may have different routing graphs, different nodes and edges (e.g., highways that may only be entered by certain robotic chassis), etc. that may result in reducing the overall route cost. In some embodiments, the control system evaluates switching robotic chassis during the route evolution step described above. For example, a first set of slower robotic chassis operate using routing graph G1=(V1, E1) and a second set of fast highway robotic chassis operate using routing graph G2=(V2, E2). In this example, at least the edge weights of G1 and G2 are different, otherwise there is no advantage in choosing a robotic chassis from either set of robotic chassis. Also, there is a subset N=V1∩V2 of nodes which are in both G1 and G2 and are accessible to both types of robotic chassis. These nodes serve as locations where pods can switch from one type of robotic chassis to the other. In FIG. 14, a slower robotic chassis from the first set of robotic chassis transports a pod from a location 1400 (X) to a location 1401 (U). During the route evolution step 1402, the control system identifies a close by faster robotic chassis from the second set of robotic chassis located at 1403 (Y) and a nearby transfer node 1404 (N1∈N). The control system evolves 1402 the route such that at 1404 (N1), the pod transfers from the slower robotic chassis to the faster robotic chassis. The faster robotic chassis drives the pod from 1404 (N1) to 1405 (N2∈N), then the pod transfers to another slower robotic chassis coming from a location 1406 (Z) that transports the pod to its final destination 1401 (U). In some embodiments, the pod is loaded and unloaded using mechanisms described above. In some embodiments, the described concept is applied to other types of customized mobile robotic chassis. For example, the control system evaluates switching a robotic chassis towing a vehicle by transferring the vehicle from one robotic chassis to another during execution of a route. For instance, to switch a first robotic towing device towing a vehicle for a second towing device while the first towing device is towing the vehicle, the second robotic towing device positions itself adjacent to the first robotic towing device towing the vehicle. The second robotic towing device extends its retractable arms and lifts coupled to the retractable arms and the first robotic towing device retracts its lifts and retractable arms. The first robotic towing device navigates to a charging station or designated parking area while the second robotic towing device completes the towing service.

In some embodiments, the control system chooses two or more robotic chassis to complete a task during the first step of the time step structure described above wherein the control system checks, for running tasks, if corresponding pods are at their final destination, and if so, removes the tasks, and finds suitable robotic chassis for pods corresponding to new tasks, and adds the required actions to the suitable chassis action queues (e.g. drive to pod, load the pod, drive to final destination, and unload pod). In some embodiments, the control system uses other methods for choosing two or more chassis to completion of a task such as Multi-Modal Bellmann-Ford or Multi-Modal Dijkstra algorithms.

In some embodiments, the control system chooses the best robotic chassis for a task by evaluating a battery level of the robotic chassis, a required driving distance of the task, and a distance of the robotic chassis to the pickup location. In some embodiments, the control system assigns an idle chassis to a task by: determining a score for each robotic chassis in the environment having at least 50% battery power by calculating the distance of the robotic chassis to the pod; determining for each of the robotic chassis if their battery level is sufficient enough to complete the full task (e.g., driving the distance to the pod, then from the pod to the final destination), and, if so, subtracting three (or another reasonable number) from their score; and, choosing the robotic chassis with the lowest score. In this way, a closer robotic chassis scores better than a further robotic chassis, and a robotic chassis with enough charge to complete the task scores higher than a robotic chassis with not enough charge. In other embodiments, the control system evaluates other variables in determining the best robotic chassis for a task. In some embodiments, the control system chooses the best robotic chassis for a task during the first step and/or the route evolution step of the time step structure described above.

Figure 15:
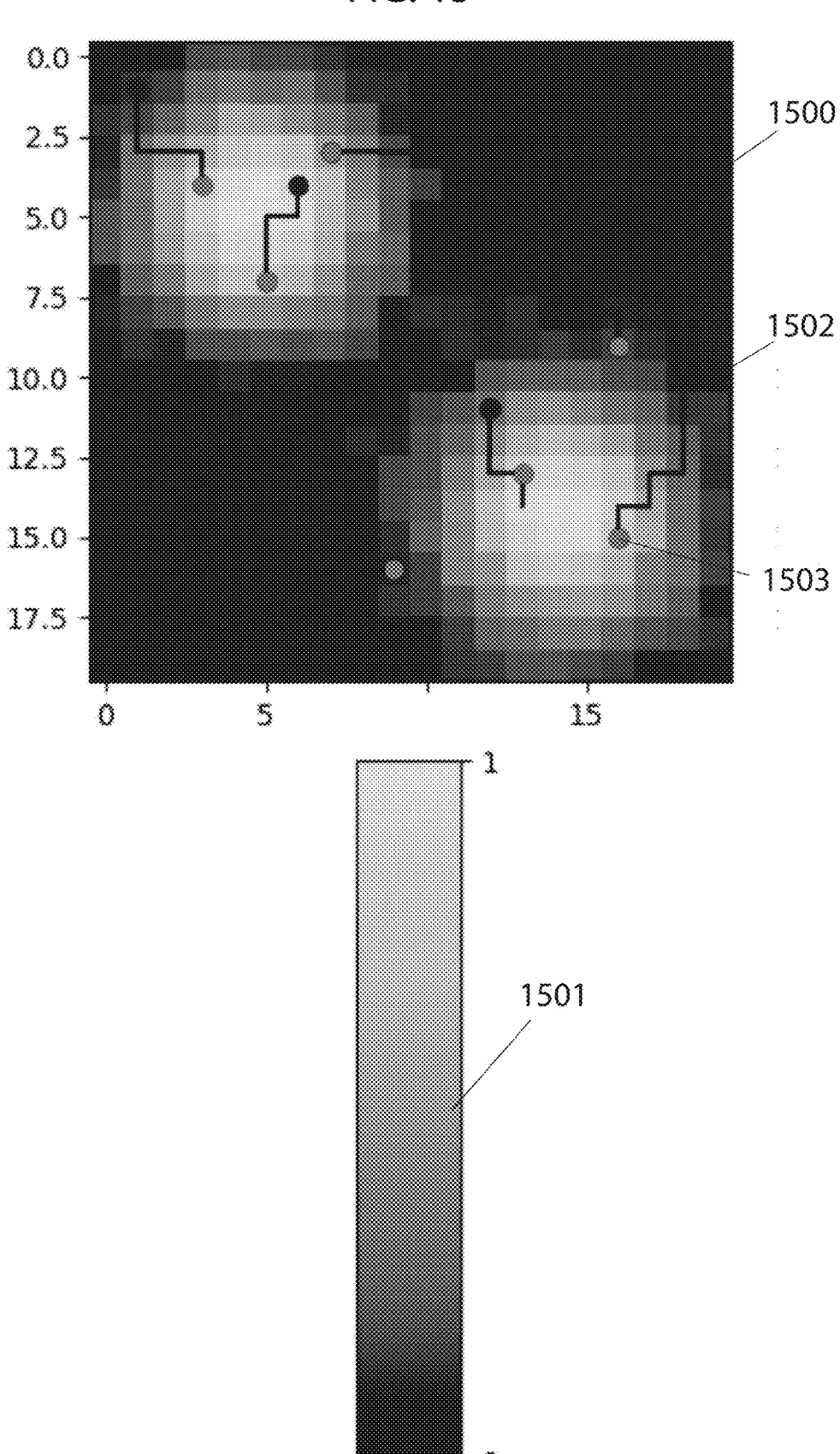
FIG. 15 illustrates how pod distribution changes after minimization of a cost function according to some embodiments.

In some embodiments, the control system distributes robotic chassis throughout the environment based on, for example, demand within different areas of the environment. In some embodiments, wherein an abundance of robotic chassis exists, the control system positions a robotic chassis close to every pod, has excess robotic chassis that are fully charged distributed throughout the environment, and immediately transfers pods from low battery robotic chassis to fully charged robotic chassis. In some embodiments, the control system may distribute robotic chassis throughout the environment using the cost function:

$$C(x, p) = \sum_{N_i} p_i \min d(N_i, x_i)$$

wherein $N_i$ is a node in the routing graph, $p_i$ is the probability that a task (or otherwise service) will start from node $N_i$ at the next time frame, and $d(N_i, x_i)$ is the distance of the closest available robotic chassis from the node Na, assuming there are n idle robotic chassis at positions $x_i$. The control system determines distribution of the robotic chassis by minimizing the cost function. For example, FIG. 15 illustrates results of minimizing the cost function to determine optimal distribution of seven idle robotic chassis within environment 1500. The color of the graph corresponds to the probability that a task will start from the particular node of the graph at the next time frame indicated by the colors on scale 1501. Darker dots 1502 represent initial position of idle robotic chassis and lighter dots 1503 represent their position after minimization of the cost function. After optimization, idle robotic chassis are closer to areas with nodes having a higher probability of a task starting.

In some embodiments, the processors of mobile robotic chassis collaborate by exchanging intelligence with one other, the information relating to, for example, current and upcoming tasks, completion or progress of tasks (particularly in cases where a task is shared), delegation of duties, preferences of a user, environmental conditions (e.g., road conditions, traffic conditions, weather conditions, obstacle density, etc.), battery power, maps of the environment, and the like. For example, a processor of a mobile robotic chassis transmits traffic conditions to processors of nearby mobile robotic chassis with whom a connection has been established such that the nearby mobile robotic chassis can avoid the high trafficked area. In another example, a processor of a mobile robotic chassis unable to complete garbage pickup of an area due to low battery level communicates with a processor of another nearby mobile robotic chassis capable of performing garbage pickup, providing the mobile robotic chassis with current progress of the task and a map of the area such that it may complete the task. In some embodiments, processors of mobile robotic chassis exchange intelligence relating to the environment (e.g., environmental sensor data) or results of historical actions such that individual processors can optimize actions at a faster rate. For example, processors of mobile robotic chassis share depth data of objects within an environment to collaboratively build a map of the environment, as is described in U.S. patent application Ser. No. 16/185,000, the entire contents of which is hereby incorporated by reference. In some embodiments, processors of mobile robotic chassis collaborate to complete a task. In some embodiments, mobile robotic chassis collaborate using methods such as those described in U.S. patent application Ser. Nos. 15/981,643, 15/986,670, and 15/048,827, the entire contents of which are hereby incorporated by reference.

In some embodiments, the processors of mobile robotic chassis (or a processor of a mobile robotic chassis and a control system) authenticate one another and establish a bond prior to collaborating (e.g., sharing data to collaboratively build a map, sharing data to complete a task, sharing data to autonomously park, etc.) using methods such as those described in U.S. patent application Ser. Nos. 15/981, 643, 15/986,670, and 15/048,827, the entire contents of which are hereby incorporated by reference.

In some embodiments, versatile mobile robotic chassis retreat to a designated parking area until requested for a particular function or task or after completing a particular function or task. For example, a mobile robotic chassis requested for pickup of persons (e.g., using an application of a communication device) autonomously traverses an environment from a parking area to a pickup location and transports the persons to a drop off location (e.g., specified using the application of the communication device). After completing the service, the mobile robotic chassis traverses the environment from the drop off location to the nearest parking area or to a designated parking area or to another requested pickup location. The mobile robotic chassis enters a parking area and autonomously parks in the parking area.

Figure 16:
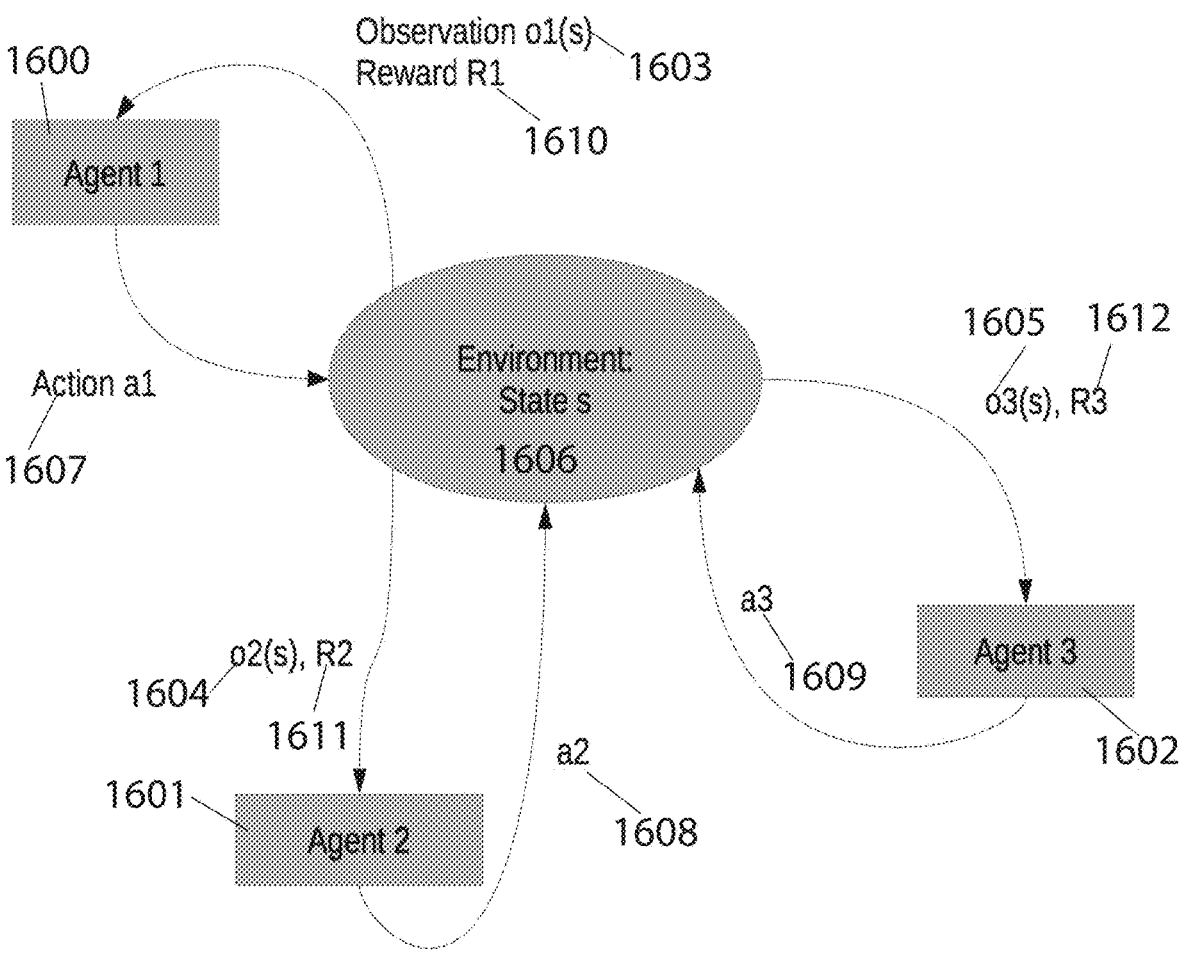
FIG. 16 illustrates an example of a multi-agent partially observable MDP according to some embodiments.

Some embodiments provide a method for autonomous parking of mobile robotic chassis. In some embodiments, the processors of mobile robotic chassis each partially observe an environment (e.g., parking area). In some embodiments, the processors of mobile robotic chassis collaborate to achieve a common goal of maximizing their performance in parking by, for example, reducing time to exit from a parking area and reducing the amount of driving within the parking area before exiting. In some embodiments, a control system (as opposed to individual processors of robotic chassis) such as the ones described and referenced to above manages all or a portion of the autonomous parking of robotic chassis in a parking area. In some embodiments, the processors of mobile robotic chassis may use a multi-agent partially observable Markov Decision Process (MDP) to maximize their performance in autonomously parking. In some embodiments, the processors represent their respective partial observation of the environment by $o^{(i)} = o^{(i)}(S)$ wherein S is the full state of the environment. FIG. 16 illustrates an example of a multi-agent partially observable MDP wherein each robotic chassis 1600, 1601, and 1602 with partial observation 1603, 1604, and 1605, respectively, interacts with environment 1606 represented by full state S by performing actions 1607, 1608, and 1609 and receiving rewards 1610, 1611, and 1612, respectively. Environment 1606 transitions from one state S to another given an action, such as actions 1607, 1608, and 1609. In this example, the full state S comprises the combined states s of each mobile robotic chassis in the parking area at a given time, and a new state of the environment is determined based on the action of each mobile robotic chassis.

Figure 17:
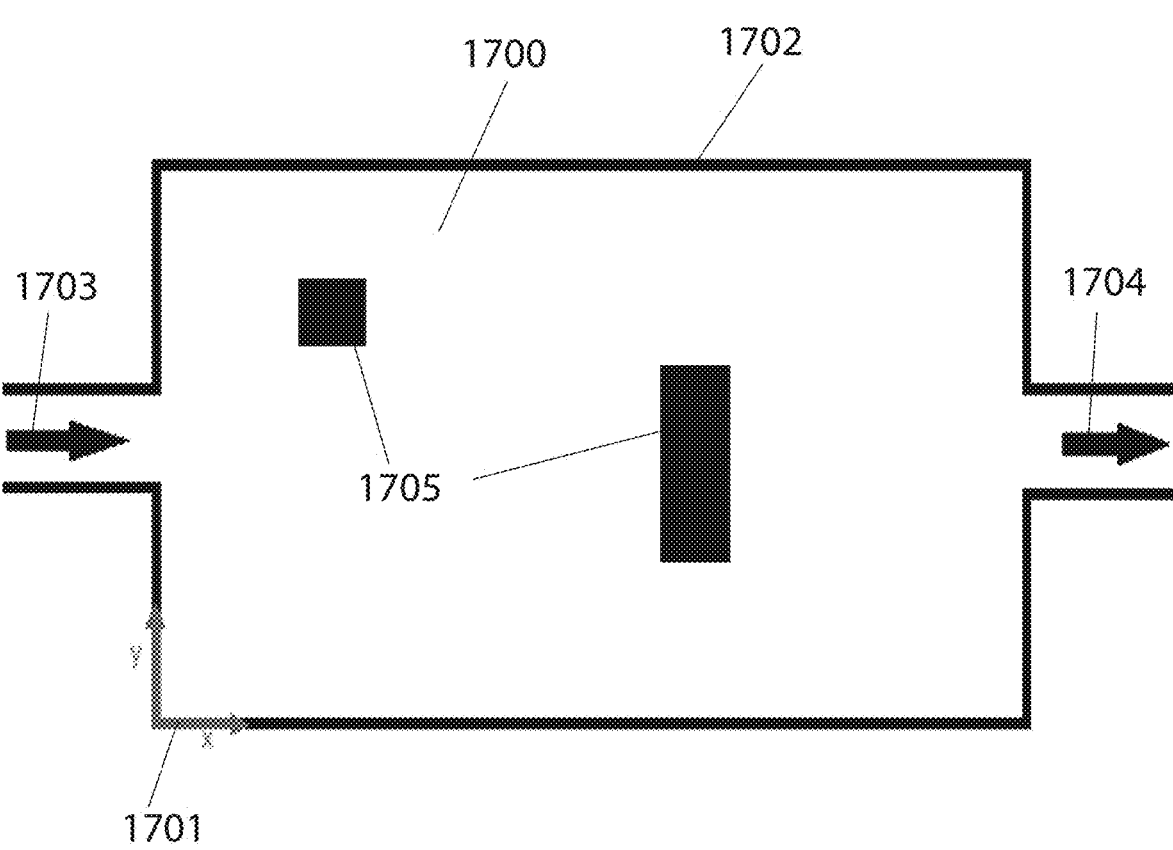
FIG. 17 illustrates an example of a parking area according to some embodiments.

In some embodiments, a map of the parking area is stored in the memories of the mobile robotic chassis. In some embodiments, the processors of mobile robotic chassis collaboratively or independently build and update a map of the parking area (and in some cases areas beyond the parking area) using methods such as those described in U.S. patent application Ser. Nos. 16/048,179, 16/048,185, 16/163,541, 16/163,562, 16/163,508, 16/185,000, 62/681,965, and 62/614,449, the entire contents of which are hereby incorporated by reference. In some embodiments, some mobile robotic chassis have a map of the parking area stored in memory and some mobile robotic chassis build a map of the parking area (and in some cases areas beyond the parking area). In some embodiments, the map of the parking area includes at least a global coordinate system such that positions of mobile robotic chassis with respect to the global coordinate system is known, the boundaries (e.g., walls), entry and exit points, and any obstacles present within the parking area. In some embodiments, processors of mobile robotic chassis determine the total space available for driving within the parking area using the map. In some embodiments, processors of mobile robotic chassis use localization methods such as those described in U.S. Patent Application Nos. 62/746,688, 62/740,573, 62/740,580, Ser. Nos. 15/955, 480, 15/425,130, and 15/955,344, the entire contents of which are hereby incorporated by reference, to determine their position within the parking area with respect to a coordinate system. FIG. 17 provides an example of a map of parking area 1700 with coordinate system 1701, boundaries 1702, entry point 1703, exit point 1704, and obstacles 1705. In some embodiments, processors of mobile robotic chassis create the map of the parking area using method referred to above. In some embodiments, processors of mobile robotic chassis collaboratively create the map of the environment using methods referred to above.

Figure 18:
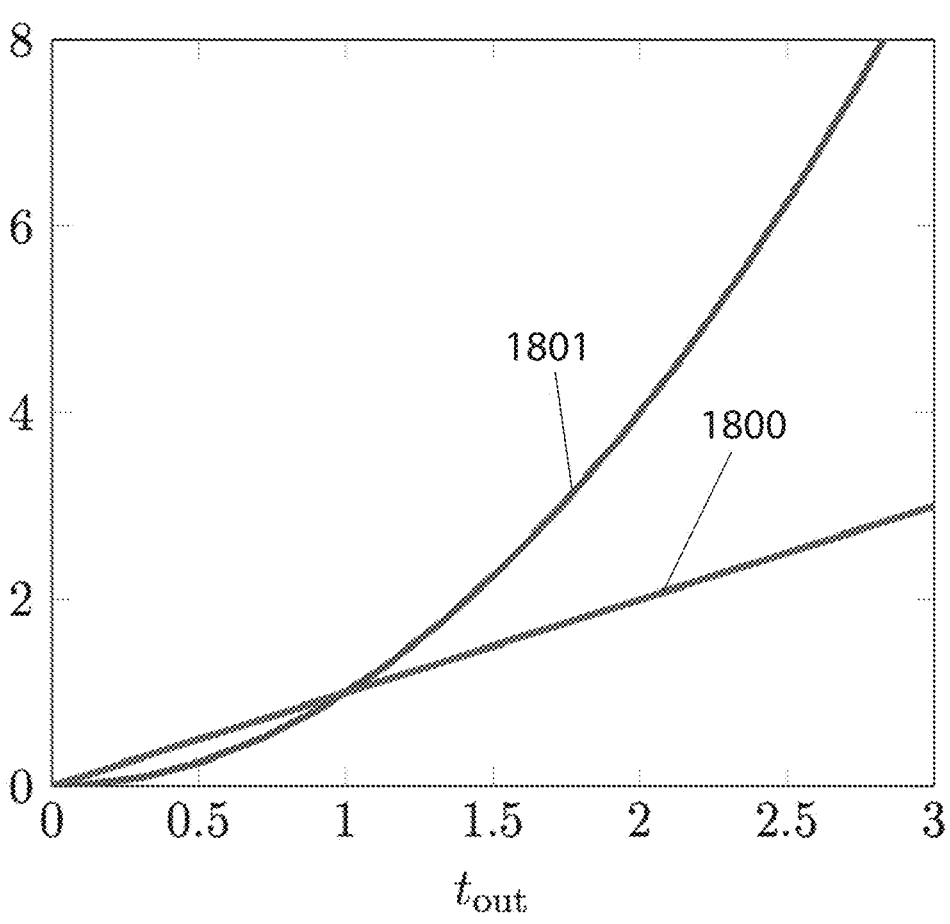
FIG. 18 illustrates an example of how a performance metric changes with increasing time to exit a parking area according to some embodiments.

In some embodiments, the processors represent the state of all mobile robotic chassis and the full state of the environment using $S=[s^{(1)}, s^{(2)}, \ldots, s^{(N)}]$ wherein N is the number of mobile robotic chassis and $s^{(i)}$ denotes the state of robotic chassis i (e.g., position, velocity, etc.). S identifies the situation in the parking area at any point in time. In some embodiments, the processors of mobile robotic chassis measure parking performance $K_{perf}$ using a linear metric wherein variables affecting performance (e.g., distance driven to exit, total time to exit, time to receive notification to exit, time to exit after receiving notification to exit, etc.) are linearly combined and are each weighted based on their importance to parking performance. For example, in some embodiments, processors calculate their parking performance $K_{perf}$ by summating $$K_{perf}^{(i)}$$

of each robotic chassis and dividing it by the number of robotic chassis. In some embodiments, processors determine their parking performance using non-linear metrics wherein the function $$K_{perf}^{(i)}$$

includes non-linear terms. For example, processors square time to exit such that time contributes quadratically and penalizes large exit times more severely. FIG. 18 illustrates $K_{perf}$ plotted against linear measure $t_{out}$ 1800 and quadratic measure $t_{out}$ 1801. For $t_{out}<1$, the difference in $K_{perf}$ is minimal, however, for $t_{out}>1$, $K_{perf}$ grows a lot faster for the quadratic measure and, as time increases, the penalty incurred becomes larger and larger whereas the penalty for the linear measure grows as a constant rate. In other embodiments, parking performance may be calculated using the worst metric recorded among all vehicles. For example, $K_{perf}$ may be calculated by summating worst recorded time to exit and distance driven to exit.

In some embodiments, processors of mobile robotic chassis assign a reward incrementally over time or at the end of the parking session (e.g., when the mobile robotic chassis exits the parking area). In some embodiments, the total reward for all mobile robotic chassis may be the sum of all the individual rewards of the mobile robotic chassis. For example, processors each assign a reward to their respective mobile robotic chassis for each time step using:

$$r^{(i)}\left(s^{(i)}, a^{(i)}\right) = \omega_1 \Delta_{dist} + \omega_2\left(t_n^{(i)} - t_{exitcall}^{(i)}\right)$$

wherein $$t_{exitcall}^{(i)}$$

is time of a user requesting the car to exit, and $\Delta_{dist}$ is the distance that the car has driven due to action $a^{(i)}$. The total reward of all autonomous vehicles may be then:

$$R_{sum}(S, A) = \sum_{i=1}^{N} r^{(i)}\left(s^{(i)}, a^{(i)}\right)$$

In some embodiments, processors of robotic chassis train themselves on making decisions that maximize the reward using deep reinforcement learning. In some embodiments, processors used a deep Q-network with either a convolutional neural network or standard neural network. In some embodiments, processors of mobile robotic chassis collaborate to decide on the next actions to execute. In some embodiments, the collaboration process includes processors communicating with one another to gain intelligence, processors computing their current estimated action-value function, processors managing conflicting actions with one another (e.g., by choosing the actions that maximize reward), robotic chassis executing actions, processors observing their respective new state and assigning a reward, and processors updating their action-value function.

In some embodiments, managing conflicting actions includes processors selecting a conflict-free action vector, processors creating a sorted list where mobile robotic chassis are ordered based on their maximum potential gain in reward, and processors iterating through the list and choosing, for each robotic chassis, the action that maximizes its individual reward. In some embodiments, processors manage conflicting actions by negotiating with their respective current estimated action-value function. In embodiments wherein actions result in conflict (e.g., a robotic wants to move to a location occupied by another robotic intending to remain in the location, actions of two robotic chassis resulting in a frontal crash, etc.), processors attempt to resolve the conflicts without creating new conflicts. In some embodiments, processors individually attempt to optimize their action-value function until there are no processors with larger potential gain in their respective field of view. In some embodiments, processors choose a sequence of actions resulting in greatest reward by considering action-value function of all or a portion of other robotic chassis. In some embodiments, processors determine all allowed action sequences that do not result in conflict for a portion of robotic chassis (e.g., four, six, or ten) within their respective field of view. In some embodiments, processors choose the sequence of actions by, for example, maximizing the combined q-values using $$\operatorname*{argmax}_{I \in I} \sum_{(i,a_i) \in I} q_i(s_i, a_i),$$

wherein $I \in I$ is an allowed action sequence of the set I of all allowed action sequences; minimizing the combined q-value difference of each involved robotic chassis $$\operatorname*{argmax}_{I \in I} \sum_{(i,a_i),(j,a_j) \in I} q_i(s_i, a_i) - q_j(s_j, a_j);$$

or, maximizing the combined weighted q-value $$\operatorname*{argmax}_{I \in I} \sum_{(i,a_i) \in I} q_i(s_i, a_i) \omega_i$$

wherein $\omega_i$ is the weight of robotic chassis i. In some embodiments, processors introduce a level of randomness in choosing actions to execute in order to promote some exploration.

In some embodiments, processors may compute their maximum gain in q-value and list robotic chassis in descending order. In some embodiments, processors iterate, starting at the top of the list and for each robotic chassis the best action sequence may be determined (e.g., no conflict and greatest gain in q-value). For example, FIG. 19 illustrates a simple grid representing a parking area with dots representing autonomous vehicles. FIGS. 19A-19C illustrate different action sequences assuming that mobile robotic chassis 1900 wants to exit. In FIG. 19A mobile robotic chassis 1900 does not negotiate with other robotic chassis and only has the option of moving away, which decreases the reward by a certain value, for illustrative purposes, 5 (time and driving penalty), resulting in an overall reward of −5 for the action sequence. In FIG. 19B robotic chassis 1900 negotiates with other robotic chassis and moves towards the exit, increasing its reward by 5. However, for mobile robotic chassis 1900 to move, robotic chassis 1901 must move, decreasing its reward by 1 (only driving penalty). The overall reward of the action sequence is therefore 4, higher than the previous case. In FIG. 19C, robotic chassis 1900 moves towards the exit, increasing its reward by 5. However, for mobile robotic chassis 1900 to move, robotic chassis 1901 must move, decreasing its reward by 1 (only driving penalty). For robotic chassis 1901 to move, robotic chassis 1902 must also move, also decreasing its reward by 1. Therefore, the overall reward of the action sequence is 3, lower than the previous case but higher than the first case. The processors negotiate and choose the best valued sequence of actions involving up to four cars. In this particular example, the action sequence illustrated in FIG. 19B is chosen. In some embodiments, processors only consider a portion of possible sequence actions and choose the first sequence action that results in a reward above a predetermined threshold. In some embodiments, the processors only save the action vector executed while discarding other action sequence combinations considered.

In some embodiments, processors represent the parking area using a logical matrix, wherein each entry corresponds with a location within the map of the parking area. A matrix element with a value of '1' indicates obstacles, while an element with a value of '0' indicates an empty space. Each grid cell may be identified as a two-dimensional coordinate. In some embodiments, robotic chassis only occupy a single grid cell and have five possible actions: up, down, left, right, and idle. In some embodiments, each time step may include: processors computing their action-values given their respective observation $o_n$ of state $s_n$ to find most optimal action; collaborating to manage conflicts if they occur by choosing the strategy that maximizes the overall reward of all robotic chassis; executing chosen actions; and, observing new local observations $o_{n+1}$ of new states $s_{n+1}$ and receiving individual rewards $r_{n+1}$. In some embodiments, processors compute an action-value table where for each possible action the estimated q-value may be determined in order to determine most optimal action. In some embodiments, processors compute the value of a state of a robotic chassis by determining the minimum distance to an exit and taking the negative of it. In some embodiments, processors multiply the reward by a predetermined value for robotic chassis attempting to exit the parking area in order to give them higher priority (i.e. placed higher in the ordered list, as described above) in the negotiation phase. In some embodiments, processors use more complex functions for calculating the value of a state, such as functions considering additional variables (e.g., time to exit, number of actions to exit, privacy of location, traffic of location, distance to obstacles, proximity to entry/exit points, etc.). For example, processors use a q-function that considers the distance to exit, privacy of a location, and proximity to entry/exit points. For a robotic chassis attempting to exit the processor uses the q-function $q_{out}=5(q_{distance}-0.25q_{privacy})$ and for a robotic chassis parked the q-function $q_{in}=q_{privacy}-0.1q_{distance}+$entry/exit penalty. For a robotic chassis attempting to exit, the distance to exit is more important than the privacy of the location, while the opposite is true for a parked robotic chassis. A parked robotic chassis may additionally be penalized for proximity to entry/exit points in order to reduce likelihood of parked robotic chassis blocking them. The q-value of a robotic chassis attempting to exit is multiplied by five to provide priority to robotic chassis attempting to exit. In some embodiments, processors compute probability to exit in the next step ($p_i$) (i.e., probability to get instruction to exit the parking area). In some embodiments, processors implement the probability to exit in computing q-values wherein the q-function is computed as a linear combination $$q_{comb}^{(i)} = p^{(i)} q_{out} + (1 - p^{(i)}) q_{in}.$$

In some embodiments, processors use stochastic gradient ascent to choose the best actions to execute where a combined q-value is computed by linearly combining n different q-tables $q_i$ corresponding with different parameters considered (e.g., distance to exit, privacy of locations, distance to entry, density of surrounding area, etc.) using $$q_{comb}(\vec{\omega}) = \sum_{i=1}^{n} \omega_i q_i.$$

Processors may learn a mapping F from state s to these n parameters maximizing individual reward wherein $\vec{\omega}=F(s)$ such that $$\vec{\omega} = \underset{\omega}{\text{argmax}}\ G(q_{comb}(\omega), s).$$

$G(q_{comb}(\omega),$ s) is the return when in state s and following policy implied by $q_{comb}(\omega)$. In embodiments, processors attempt to find the best fit using $$\hat{\omega} = \underset{\omega}{\text{argmin}} \sum_{s} \|V(s) - q_{comb}(s, \omega)\|^2,$$

wherein V(s) is the state value function, then update $\omega$ slightly in direction of $\hat{\omega}$. In some embodiments, processors may use q-learning to choose the best possible action. Processors being with preset q-values for exiting robotic chassis $q_{out}$ and parked robotic chassis $q_{in}$. With each step, the processors update their respective current action-value function $q(s_n)=(1-\alpha)q(s_n)+\alpha(q(s_{n+1})+r_{n+1})$. In some embodiments, q-tables are updated in real time. In some embodiments, processors account for current experience in the q-function by adding $q_{current}$ to the calculated q-value. In some embodiments, processors decay $q_{current}$ to provide dynamic behaviour. For example, in each time step processors decay $q_{current}$ by $(1-\alpha)$, $\alpha<<0$ or if another robotic chassis moves into position s, the particular position is discouraged by subtracting a factor $\beta$, $\beta>0$ from $q_{current}$.

Figure 20A:
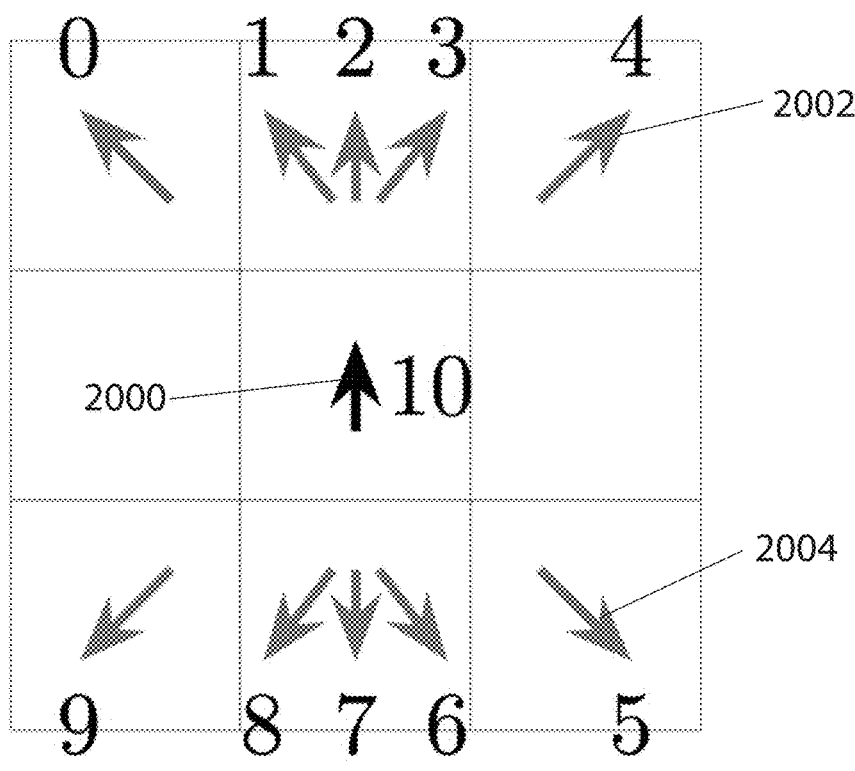
FIGS. 20A and 20B illustrate possible actions of a robotic chassis in a parking area according to some embodiments.
Figure 20B:
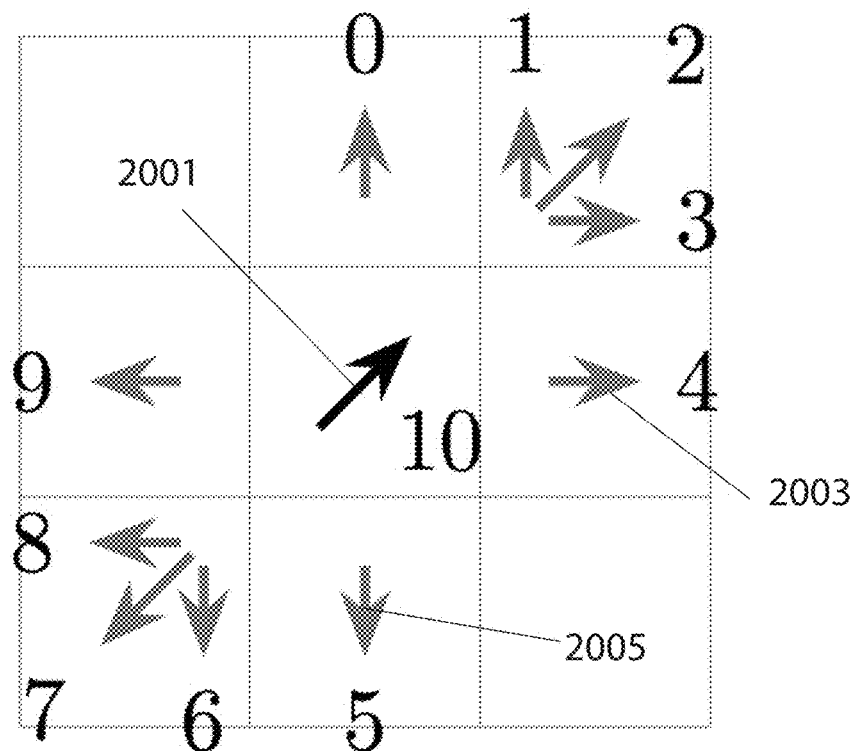

In some embodiments, processors of robotic chassis use higher resolution grids to represent the parking area, where vehicles occupy more than a single grid cell. In some embodiments, processors consider various possible actions, such as move upward, upward-right, right, downward-right, downward, downward-left, left, and upward-left. In other embodiments, other possible actions are used. For example, FIGS. 20A and 20B illustrate allowed actions in two starting directions indicated by black arrows 2000 and 2001. Grey arrows 2002 and 2003 numbered 0-4 are actions directed forwards and grey arrows 2004 and 2005 numbered 5-9 are actions directed backwards while black arrows 2000 and 2001 numbered 10 indicate idling.

Figure 21:
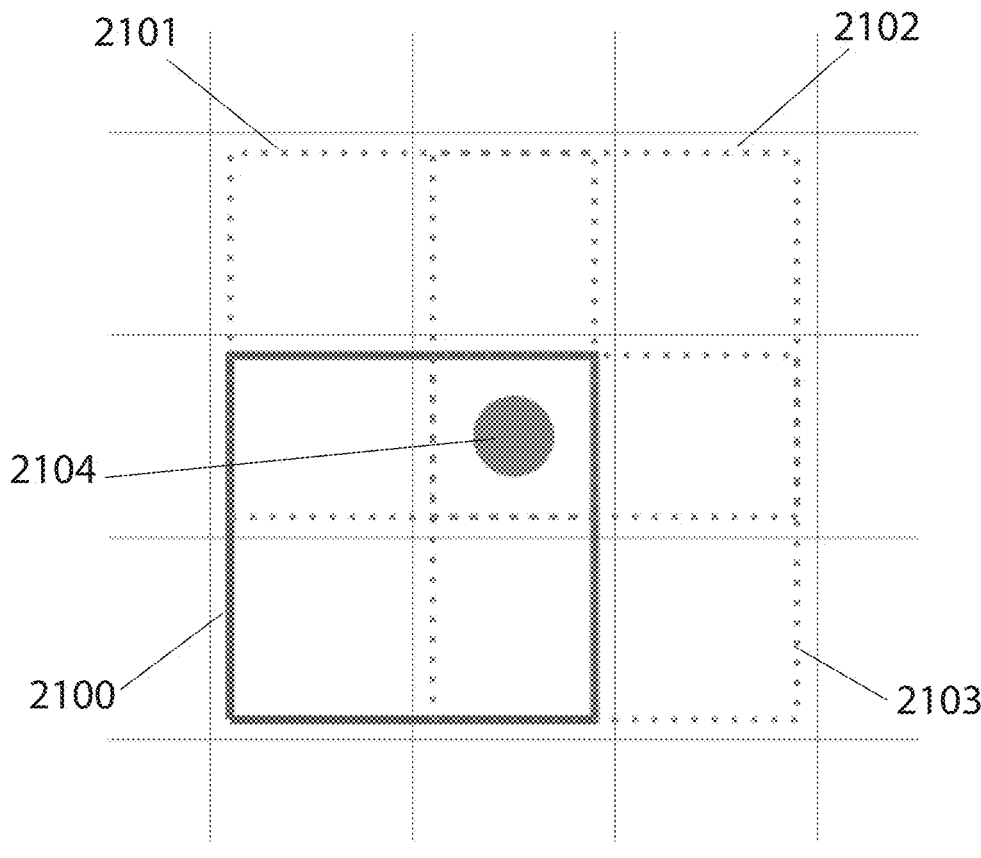
FIG. 21 illustrates four 2-by-2 blocks of a particular parking spot according to some embodiments.

In some embodiments, processors use an event driven approach wherein a mapping based on events is used to map a parking space to a reward value. In some embodiments, processors use the events, enter, exit, and optimize. The event enter describes the robotic chassis entering the parking area and finding the best valued parking spot, finding an efficient route, and driving there. In some embodiments, processors of robotic chassis determine their route using methods such as those described in U.S. patent Ser. Nos. 16/041,286, 15/406,890, 14/673,633, and 16/163,530, the entire contents of which are hereby incorporated by reference. In some embodiments, processors may use an algorithm, such as Dijkstra's algorithm, to determine the most efficient route. In some embodiments, processors determine the best valued parking spot upon entering the parking area based on the distance from entry to the parking spot, distance to exit from the parking spot, and the amount of driving while instructed to remain parked (e.g., due to collaboration). In some embodiments, processors estimate the amount of driving while instructed to remain parked using, for example, $d_{parked}=(1/p-t_{exit}-t_{spot})e_{parked}$, given an approximation for the expected amount of driving per time step $e_{parked}$ for each parking spot, where p is the exit probability and $t_{exit}$ and $t_{spot}$ refer to the time required to exit from the parking spot and the time to get to the parking spot, respectively. In some embodiments, processors may use Dijkstra's algorithm to estimate distance and times. The event exit describes a robotic chassis getting instruction to exit, finding an efficient exit route, and driving there. In some embodiments, processors used Dijkstra's algorithm to approximate exit time and driving cost. In some embodiments, processors assign edges weights that correspond to the expected driving impact of moving from one space to another (e.g., for an empty space processors use a weight of $-1$ as only vehicle needs to move one space). If a tile is not empty other robotic chassis must move. An estimate of the weight is adjusted by, for example, subtracting $$\left(\max\left(\frac{\text{number of robotic chassis}}{\text{number of obstacles}}\right) - 1\right),$$

wherein the maximum is taken over four 2-by-2 cells surrounding the cell corresponding with the parking spot of the robotic chassis. FIG. 21 illustrates an example of four possible 2-by-2 blocks 2100, 2101, 2102, and 2103 of a robotic chassis in parking spot 2104. The event optimize describes processors revaluating their current location and choosing to execute an action based on current known information. In some embodiments, processors of robotic chassis negotiate to determine best actions to execute. In some embodiments, processors use q-learning to adaptively learn parking spot values.

In some embodiments, the processors may represent the parking area and robotic chassis using a graph with nodes connected by edges, the nodes representing parking spots and edges representing a possible path from one parking spot to another. In some embodiments, processors assign nodes additional information (e.g., occupied/unoccupied, entry or exit, etc.). In some embodiments, processors assign edges weights that correspond with the cost of a robotic chassis moving along those edges.

In some embodiments, processors represent the parking area and robotic chassis using a fully continuous model, such as a classical mechanics particle model. In some embodiments, the parking area may be represented as a unit square [0, 1]x[0, 1] with walls at x=0, 1 and y=0, 1 with any position within the parking area is indicated by (x, y) coordinates. In some embodiments, each robotic chassis has a position $\vec{x}=(x, y)\in[0, 1]x[0, 1]$, velocity $\vec{v}=(v_x, v_y)$ and force acting on the robotic chassis $\vec{f}=(f_x, f_y)$. In some embodiments, processors may update the position, velocity, and force according to Newton's equations of motion. In some embodiments, processors derive the force from a potential function $\vec{f}=-\nabla U(\vec{x})$. The potential function U models an energy surface and the force points in the direction of steepest descent, thus trying to minimize the current energy state. In some embodiments, the processors determine the potential function as the sum over different types of interactions. For example, the potential function for chassis-to-chassis interaction is 1/r, wherein r is the distance between robotic chassis. The function pushes the two robotic chassis away from one another, the effect becoming stronger the closer the chassis are. The potential function for chassis-to-wall interaction is 1/r, wherein r is the distance between the robotic chassis and wall. The function pushes the robotic chassis away from the wall, the effect becoming stronger the closer the chassis is to the wall. The potential function for chassis-to-exit interaction is r, wherein r is the distance between the robotic chassis and the exit. The function constantly pulls the robotic chassis in the direction of the exit. In some embodiments, processors incorporate friction into the computation of using $\vec{f} = -\nabla U(\vec{x}) - \gamma \vec{v}$, wherein $\gamma$ is a friction constant. In some embodiments, processors assign a direction to their respective robotic chassis, are limited to accelerating and steering, and are prohibited from moving in a sideways direction in the above described continuous model for determining most optimal actions to execute. In some embodiments, processors use similar variables as described above to measure performance (e.g., time to exit, distance to exit, privacy of location, etc.).

In some embodiments, the autonomous parking method described above is used for non-autonomous vehicles, wherein autonomous robotic devices transport non-autonomous vehicles and use the same approach described above for autonomous parking of autonomous mobile robotic chassis. In some embodiments, autonomous robotic devices transport non-autonomous vehicles using a towing mechanism such as that described in U.S. Patent Application Nos. 62/626,867 and 62/616,326, the entire contents of which is hereby incorporated by reference. In other embodiments, non-autonomous vehicles are positioned on a platform of the autonomous robotic devices such that they may transport the non-autonomous vehicles. In some embodiments, non-autonomous vehicles drive up a ramp to position the vehicle on the platform and in other embodiments, the platform lowers and the vehicles drives onto the platform. In some embodiments, a lift is place beneath the chassis of the non-autonomous vehicle and raises it for transportation. In other embodiments, a wheel lift is used to transport the non-autonomous vehicle. Other methods of transporting a non-autonomous vehicle are possible. An example of a robotic device with a platform for transportation is described in U.S. patent application Ser. No. 16/127,038, the entire contents of which is hereby incorporated by reference. In some embodiments, non-autonomous vehicles transported by robotic devices and autonomous mobile robotic chassis park within the same parking area.

In some embodiments, all or a portion of the operations described above are applied to different types of autonomous vehicle systems. In some embodiments, all or a portion of the operations executed by the control system managing multiple autonomous vehicles, as described above, are performed by processors of the autonomous vehicles.

In some embodiments, one or more external processing devices compute a portion or all operations described above. In some embodiments, a portion or all information is stored on an external device or in the cloud.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or"

is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A versatile robotic towing chassis comprising:
a chassis;
a set of wheels coupled to the chassis;
one or more motors;
one or more processors;
one or more autonomously adjustable arms coupled to the versatile robotic towing chassis;
one or more autonomously lifting components coupled to the versatile robotic towing chassis;
a casing coupled to the versatile robotic towing chassis;
a plurality of sensors;
a battery; and
a tangible, non-transitory, machine-readable medium storing instructions that when executed by the processor effectuates operations, comprising:
capturing, with the plurality of sensors, sensor data;
autonomously navigating to a payload;
autonomously coupling with the payload;
autonomously towing or carrying the payload to a destination comprising:
recognizing, with the one or more processors, at least a street sign, a pot hole, and a speed bump based on at least some of the sensor data; and
responding, with the versatile robotic towing chassis, to the at least street sign, pot hole, and speed bump;
wherein:
the versatile robotic towing chassis is customizable in order to couple with a variety of payload types; and
autonomously coupling with the payload comprises:
utilizing a combination of one or more arms and lifting components, and morphing into a compatible form or arrangement by autonomously executing appropriate software components that enable different robotic functions and forms required for coupling with each type of payload.

2. The versatile robotic towing chassis of claim 1, wherein the operations further comprise:
receiving, with the one or more processors, a request for a delivery of a payload item to a location from an application of a communication device or a control system managing the versatile robotic towing chassis.

3. The versatile robotic towing chassis of claim 2, wherein the application of the communication device is configured to:
receive at least one input designating at least six of: a request for a service at a service location, a service type, a service location, a request for delivery of an item comprising at least one of a pickup location and a delivery location of an item, a schedule for executing a delivery or service, a travel speed, an audio level, an air temperature, a seat temperature, and a navigation route; and
display versatile robotic towing chassis information comprising at least six of: a battery level, a wheel pressure, a windshield washer fluid level, average travel speed, a current speed, an average travel time, an expected travel time, a navigation route, a traffic information, a current location, and an obstacle density.

4. The versatile robotic towing chassis of claim 3, wherein the application of the communication device displays in the map: the current location, pickup location, drop off location, and navigation route.

5. The versatile robotic towing chassis of claim 1, wherein the operations further comprise:

receiving, with the processor, a request for a service at a service location from an application of a communication device or a control system managing the versatile robotic towing chassis.

6. The versatile robotic towing chassis of claim 1, wherein the versatile robotic towing chassis remains parked at a parking location until receiving a request to perform a delivery or service.

7. The versatile robotic towing chassis of claim 1, wherein:

a control system manages a group of versatile robotic towing chassis of which the versatile robotic towing chassis belongs to; and the control system selects which versatile robotic towing chassis from the group of versatile robotic towing chassis executes a task based on at least a battery level of each versatile robotic towing chassis, a driving distance of the task, and a distance of each versatile robotic towing chassis to a task location.

8. The versatile robotic towing chassis of claim 7, wherein the task comprises a delivery of an item to a delivery location.

9. The versatile robotic towing chassis of claim 8, wherein the control system detects completion of the task by the selected versatile robotic towing chassis based on its location being at a delivery location.

10. The versatile robotic towing chassis of claim 7, wherein the versatile robotic towing chassis transmits information to the control system comprising at least one of road conditions, weather conditions, solar conditions, traffic conditions, an obstacle density, obstacle types, a road type, a location of perimeters and obstacles, a map, a weight of a transported item or person, a number of items being transported, a travel speed, wheel conditions, a battery level, a solar energy, oil levels, wind shield fluid levels, GPS coordinates, a fuel level, a distance travelled, a vehicle status, a current operation being executed, upcoming operations to execute, scheduling information, a designated storage or parking location, and hardware, software, and equipment availability.

11. The versatile robotic towing chassis of claim 1, wherein at least a portion of the operations are executed by an external device.

12. The versatile robotic towing chassis of claim 1, wherein the versatile robotic towing chassis navigates to a charging station when a battery level of the battery is below a predetermined threshold.

13. The versatile robotic towing chassis of claim 1, wherein the versatile robotic towing chassis collaborates with at least one other versatile robotic towing chassis by sharing information comprising at least one of current and upcoming tasks, completion or progress of tasks, delegation of duties, preferences of a user, environmental conditions comprising road conditions, traffic conditions, weather conditions, and obstacle density, battery level, and maps of an environment.

14. The versatile robotic towing chassis of claim 1, wherein the versatile robotic towing chassis is configured with a user activated voice command.

15. The versatile robotic towing chassis of claim 1, wherein the versatile robotic towing chassis couples to at least one other versatile robotic towing chassis to form a larger versatile robotic towing chassis.

16. The versatile robotic towing chassis of claim 15, wherein the versatile robotic towing chassis and the at least one other versatile robotic towing chassis are temporarily coupled to execute a particular task.

17. The versatile robotic towing chassis of claim 1, wherein the components that enable different functions comprise a container, a pod, a shovel, a wheel lift, a robotic arm, and a forklift.

18. The versatile robotic towing chassis of claim 17, wherein one function comprises pickup and delivery of a payload containing food items.

19. The versatile robotic towing chassis of claim 17, wherein one function comprises transportation of a trash bin from a storage location to a refuse collection location.

20. The versatile robotic towing chassis of claim 1, wherein the components are coupled to and removed from the versatile robotic towing chassis such that the versatile robotic towing chassis provides different functions at different time points based on the components currently coupled to the versatile robotic towing chassis.

* * * * *